US008920541B2

(12) United States Patent
Ni et al.

(10) Patent No.: US 8,920,541 B2
(45) Date of Patent: *Dec. 30, 2014

(54) LINKER EXCHANGE IN ZEOLITIC IMIDAZOLATE FRAMEWORKS

(71) Applicant: ExxonMobil Research and Engineering Company, Annandale, NJ (US)

(72) Inventors: Zheng Ni, Annandale, NJ (US); Mobae Afeworki, Phillipsburg, NJ (US); Simon Christopher Weston, Annandale, NJ (US); John Zengel, Clinton, NJ (US); David Lawrence Stern, Fairfax, VA (US)

(73) Assignee: ExxonMobile Research and Engineering Company, Annandale, NJ (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/838,820

(22) Filed: Mar. 15, 2013

(65) Prior Publication Data

US 2013/0259783 A1 Oct. 3, 2013

Related U.S. Application Data

(60) Provisional application No. 61/618,057, filed on Mar. 30, 2012.

(51) Int. Cl.
*B01D 53/02* (2006.01)
*B01J 20/30* (2006.01)
*B01D 53/14* (2006.01)
*B01J 20/22* (2006.01)
*B01D 53/04* (2006.01)
*B01J 31/22* (2006.01)

(52) U.S. Cl.
CPC ......... *B01J 20/3085* (2013.01); *B01D 53/1475* (2013.01); *B01J 20/223* (2013.01); *B01D 53/04* (2013.01); *B01J 31/2295* (2013.01); *B01D 53/02* (2013.01); *B01D 2253/204* (2013.01); *B01D 2257/504* (2013.01)
USPC ............... 95/116; 95/128; 96/108; 423/210; 423/226; 548/108; 502/60; 502/62

(58) Field of Classification Search
USPC ............... 95/116, 128; 96/108; 423/210, 226; 548/108; 502/60, 62
See application file for complete search history.

(56) References Cited

U.S. PATENT DOCUMENTS

2007/0202038 A1 8/2007 Yaghi et al.
2009/0211440 A1 8/2009 Reyes et al.
2009/0211441 A1 8/2009 Reyes et al.
2009/0214407 A1 8/2009 Reyes et al.
2009/0216059 A1 8/2009 Reyes et al.
2010/0307336 A1 12/2010 Ni et al.

FOREIGN PATENT DOCUMENTS

WO 2008140788 A1 11/2008
WO 2010141310 A1 12/2010

OTHER PUBLICATIONS

Hayashi, Hideki et al., "Zeolite A imidazolate frameworks", Nature Materials, Jul. 1, 2007, pp. 501-506, vol. 6, No. 7, Nature Publishing Group.
Beldon, P.J. et al., "Rapid Room-Temperature Synthesis of Zeolitic Imidazolate Frameworks by Using Mechanochemistry", Angew. Chem. Int. Ed., Dec. 10, 2010, pp. 9640-9643, vol. 49, No. 50, Wiley-VCH, Weinheim.
Zhu, Al-Xin et al., "Zeolitic metal azolate frameworks (MAFs) from ZnO/Zn(OH)2 and monoalkyl-substituted imidaoles and 1,2,4-triazoles: Efficient syntheses and properties", Microporous and Mesoporous Materials, Nov. 28, 2011, pp. 42-49, vol. 157, No. 28, Elsevier, Inc.
Banerjee, Rahul, et al., "High-Throughput Synthesis of Zeolitic Imidazolate Frameworks and Application of Co2 Capture", Science, Feb. 15, 2008, pp. 939-943, vol. 319, No. 5865, American Assoc. for the Advancement of Science, Washington, D.C.
Park, Kyo Sung et al., "Exceptional chemical and thermal stability of zeolitic imidazolate frameworks", Proceedings of the National Academy of Sciences, Jul. 5, 2006, p. 10187, vol. 103, No. 27, PNAS, Nat'l. Academy of Sciences.
Kim, Min et al., "Postsynthetic ligand exchange as a route to functionalization of 'inert' metal-organic frameworks", Chemical Science, Jan. 2012, pp. 126-130, vol. 3, No. 1, Royal Society of Chemistry GBR.
Morris, William et al., "Crystals as Molecules: Postsynthesis Covalent Functionalization of Zeolitic Imidazolate Frameworks", Journal of the American Chemical Society, pp. 12626-12627, vol. 130, No. 38, ACS Publications, 2008.
Wang, Zhenqiang et al., "Postsynthetic modification of metal-organic frameworks", Chemical Society Reviews, 2009, pp. 1315-1329, vol. 38, Royal Society of Chemistry.
Karagiaridi, Olga et al., "Synthesis and characterization of isostructural cadium zeolitic imidazolate frameworks via solvent-assisted linker exchange", Chemical Science, 2012, pp. 3526-3260, vol. 3, No. 11, Royal Society of Chemistry.

(Continued)

*Primary Examiner* — Christopher P Jones
(74) *Attorney, Agent, or Firm* — David M. Weisberg; Andrew T. Ward

(57) ABSTRACT

A method is provided for replacing at least a portion of the organic linker content of a zeolitic imidazolate framework composition. The method comprises exchanging the organic linker with another organic linker. Also provided is a new material, designated as EMM-19, and a method of using EMM-19 to adsorb gases, such as carbon dioxide.

30 Claims, 20 Drawing Sheets

(56) References Cited

OTHER PUBLICATIONS

Karagiaridi, Olga et al., "Opening ZIF-8: A Catalytically Active Zeolitic Imidazolate Framework of Sodalite Topology with Unsubstituted Linkers", Journal of the American Chemical Society, Nov. 14, 2012, pp. 18790-18796, vol. 134, No. 45, American Chemical Society Publications.

Kim, Min et al., "Postsynthetic Ligand and Cation Exchange in Robust Metal-Organic Frameworks", Journal of the American Chemical Society, Oct. 31, 2012, pp. 18082-18088, vol. 134, No. 43, American Chemical Society Publications.

International Search Report with Written Opinion for PCT/US2013/034310 dated Oct. 9, 2013.

International Search Report with Written Opinion for PCT/US2013/034321 dated Oct. 22, 2013.

Xiaochun et al., "[Zn(bim)2] • (H20)1.67: A metalorganic open-framework with sodalite topology", Chinese Science Bulletin, 2003, 48 (15), pp. 1531-1534.

Morris et al., "A Combined Experimental-Computational Study on the Effect of Topology on Carbon Dioxide Adsorption in Zeolitic Imidazolate Frameworks", J. Phys. Chem. C 2012, 116, pp. 24084-24090.

Bloch et al., "Hydrocarbon Separations in a Metal-Organic Framework with Open Iron(II) Coordination Sites", Science, 2012, 335 (6076), pp. 1606-1610.

Kim et al., "Postsynthetic Ligand Exchange as a Route to Functionalization of 'Inert' Metal-Organic Frameworks", Chemical Science, vol. 3, 2012, pp. 126-130.

Burnett et al., "Stepwise Synthesis of Metal—Organic Frameworks: Replacement of Structural Organic Linkers", Journal of the American Chemical Society, vol. 133, 2011, pp. 9984-9987.

Park et al., "Exceptional Chemical and Thermal Stability of Zeolitic Imidazolate Frameworks", Proceedings of the National Academy of Sciences of U.S.A., vol. 103, 2006, pp. 10186-10191.

Hayashi et al., "Zeolite A Imidazolate Frameworks", Nature Materials, vol. 6, 2007, pp. 501-506.

Banerjee et al., "High-Throughput Synthesis of Zeolitic Imidazolate Frameworks and Application to CO2 Capture", Science, vol. 319, 2008, pp. 939-943; ISSN: 1095-9203.

Wang et al., "Colossal Cages in Zeolitic Imidazolate Frameworks as Selective Carbon Dioxide Reservoirs", Nature, vol. 453, 2008, pp. 207-212.

Banerjee et al., "Control of Pore Size and Functionality in Isoreticular Zeolitic Imidazolate Frameworks and their Carbon Dioxide Selective Capture Properties", Journal of the American Chemical Society, vol. 131, 2009, pp. 3875-3877.

Morris et al., "A Combined Experimental-Computational Investigation of Carbon Dioxide Capture in a Series of Isoreticular Zeolitic Imidazolate Frameworks", Journal of the American Chemical Society, vol. 132, 2010, pp. 11006-11008.

Phan et al., "Synthesis, Structure, and Carbon Dioxide Capture Properties of Zeolitic Imidazolate Frameworks", Accounts of Chemical Research, vol. 43, 2010, pp. 58-67.

Morris et al., "Crystals as Molecules: Postsynthesis Covalent Functionalization of Zeolitic Imidazolate Frameworks", Journal of the American Chemical Society, vol. 130, 2008, pp. 12626-12627.

Ockwig et al., "Reticular Chemistry: Ocurrence and Taxonomy of Nets and Grammar for the Design of Frameworks", Accounts of Chemical Research, vol. 38, 2005, pp. 176-182.

Seoane et al., "Insight into the crystal synthesis, activation and application of ZIF-20", The Royal Society of Chemistry Advances, vol. 1, 2011, pp. 917-922.

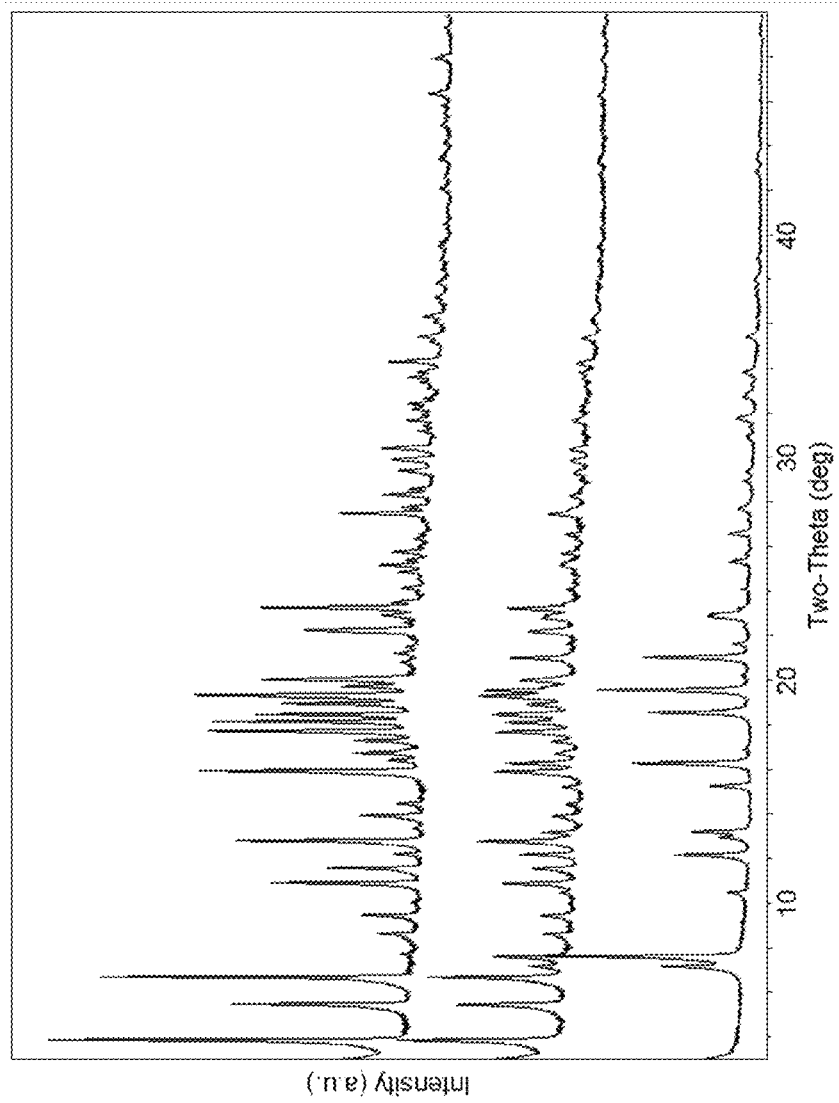

LINKER EXCHANGE IN ZEOLITIC IMIDAZOLATE FRAMEWORKS

CROSS-REFERENCE TO RELATED APPLICATIONS

This application claims the benefit of U.S. Ser. No. 61/618,057, filed Mar. 30, 2012, the entire contents of which are hereby incorporated by reference.

This application is also related to two other co-pending U.S. applications, filed on even date herewith and entitled "EMM-19*: Novel Zeolitic Imidazolate Framework Material, Methods for Making Same, and Uses Thereof" and "EMM-19: Novel Zeolitic Imidazolate Framework Material, Methods for Making Same, and Uses Thereof", respectively, the entire contents of each of which are also incorporated by reference herein.

FIELD OF THE INVENTION

This invention relates to porous crystalline materials, their synthesis and their use.

BACKGROUND OF THE INVENTION

One known family of porous crystalline materials are zeolitic materials, which are based on the 3-dimensional, four-connected framework structure defined by corner-sharing [TO$_4$] tetrahedra, where T is any tetrahedrally coordinated cation. Among the known materials in this family are silicates that contain a three-dimensional microporous crystal framework structure of [SiO$_4$] corner sharing tetrahedral units, aluminosilicates that contain a three-dimensional microporous crystal framework structure of [SiO$_4$] and [AlO$_4$] corner sharing tetrahedral units, aluminophosphates that contain a three-dimensional microporous crystal framework structure of [AlO$_4$] and [PO$_4$] corner sharing tetrahedral units, and silicoaluminophosphates (SAPOs), in which the framework structure is composed of [SiO$_4$], [AlO$_4$] and [PO$_4$] corner sharing tetrahedral units. Included in the zeolitic family of materials are over 200 different porous framework types, many of which have great commercial value as catalysts and adsorbents.

Zeolitic imidazolate frameworks or ZIFs have properties similar to inorganic zeolitic materials. ZIFs are based on [M(IM)$_4$] tetrahedral bonds in which IM is an imidazolate type linking moiety and M is a transition metal. These materials are generally referred to as zeolitic imidazolate frameworks or ZIFs since the angle formed by imidazolates (IMs) when bridging transition metals is similar to the 145° angle of the Si—O—Si bond in zeolites. ZIF counterparts of a large number of known zeolitic structures have been produced. In addition, porous framework types, hitherto unknown to zeolites, have also been produced. Discussion of this research can be found in, for example, the following publications from Yaghi and his co-workers: "Exceptional Chemical and Thermal Stability of Zeolitic Imidazolate Frameworks", *Proceedings of the National Academy of Sciences of U.S.A.*, Vol. 103, 2006, pp. 10186-91, "Zeolite A Imidazolate Frameworks", *Nature Materials*, Vol. 6, 2007, pp. 501-6, "High-Throughput Synthesis of Zeolitic Imidazolate Frameworks and Application to CO$_2$ Capture", *Science*, Vol. 319, 2008, pp. 939-43, "Colossal Cages in Zeolitic Imidazolate Frameworks as Selective Carbon Dioxide Reservoirs", *Nature*, Vol. 453, 2008, pp. 207-12, "Control of Pore Size and Functionality in Isoreticular Zeolitic Imidazolate Frameworks and their Carbon Dioxide Selective Capture Properties", *Journal of the American Chemical Society*, Vol. 131, 2009, pp. 3875-7, "A Combined Experimental-Computational Investigation of Carbon Dioxide Capture in a Series of Isoreticular Zeolitic Imidazolate Frameworks", *Journal of the American Chemical Society*, Vol. 132, 2010, pp. 11006-8, and "Synthesis, Structure, and Carbon Dioxide Capture Properties of Zeolitic Imidazolate Frameworks", *Accounts of Chemical Research*, Vol. 43, 2010, pp. 58-67.

Much of this work on ZIF structures is summarized in U.S. Patent Application Publication No. 2007/0202038, the entire contents of which are incorporated herein by reference. In particular, the '038 publication discloses a zeolitic framework, comprising the general structure: M-L-M, wherein M comprises a transition metal and L is a linking moiety comprising a structure selected from the group consisting of I, II, III, or any combination thereof:

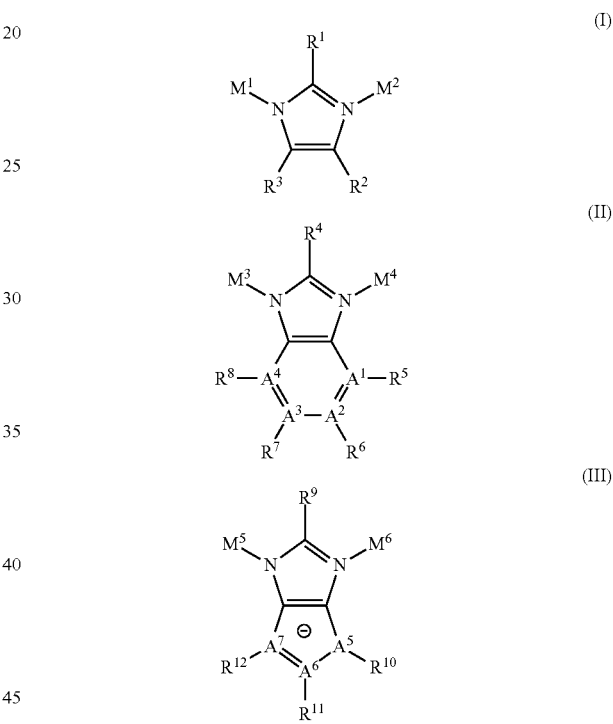

wherein $A^1, A^2, A^3, A^4, A^5, A^6$, and $A^7$ can be either C or N, wherein $R^5$-$R^8$ are present when $A^1$ and $A^4$ comprise C, wherein $R^1$, $R^4$ or $R^9$ comprise a non-sterically hindering group that does not interfere with M, wherein $R^2$, $R^3$, $R^5$, $R^6$, $R^7$, $R^8$, $R^{10}$, $R^{11}$, and $R^{12}$ are each individually an alkyl, halo-, cyano-, nitro-, wherein $M^1$, $M^2$, $M^3$, $M^4$, $M^5$, and $M^6$ each comprise a transition metal, wherein when the linking moiety comprises structure III, $R^{10}$, $R^{11}$, and $R^{12}$ are each individually electron withdrawing groups.

In a more recent work by Ni et al., the structure and synthesis of mixed-valence ZIFs are disclosed in U.S. Patent Application Publication No. 2010/0307336. Specifically, the authors disclose in the '336 publication a porous crystalline material having a tetrahedral framework comprising a general structure. $M^1$-IM-$M^2$, wherein $M^1$ comprises a metal having a first valency, wherein $M^2$ comprises a metal having a second valency different from said first valency, and wherein IM is imidazolate or a substituted imidazolate linking moiety. Such materials can sometimes be described as iso-structural to known ZIF materials.

ZIF materials may be conventionally prepared by dissolving sources of metal ions and sources of imidazolate or substituted imidazolate linkers in an appropriate solvent to form a reaction mixture and then maintaining this reaction mixture under conditions sufficient to form the crystalline ZIF materials as a precipitate. For example, in U.S. Patent Application Publication No. 2007/0202038, it is stated that ZIF materials may be prepared using solvothermal techniques. These techniques may involve combining a hydrated metal salt (e.g., nitrate) and an imidazole-type organic compound in an amide solvent, such as N,N-diethylformamide (DEF), followed by heating (e.g., to 85-150° C.) the resultant solutions for 48-96 hours to precipitate with a zeolitic framework.

One problem with the precipitation or solvothermal method for forming ZIF materials is that it affords one little or no control over the framework type of the zeolitic material obtained. For example, as reported in the literature, when a ZIF is crystallized from a solution of zinc ions and 5-azabenzimidazole molecules, the resulting ZIF material (i.e., ZIF-22) tends to have the LTA framework type; see, for example, the aforementioned article "Zeolite A Imidazolate Frameworks", *Nature Materials*, Vol. 6, 2007, pp. 501-6 by Yaghi and his co-workers.

Another problem with the precipitation or solvothermal method for forming ZIF materials is that it may be difficult or impossible to incorporate a desired functional group on an imidazolate-type linker into a ZIF of the desired framework type. As noted above, conventional synthesis of ZF-22 results in a LTA structure having a 5-azabenzimidazolate linker. The 5-aza group on the linker has functionality as a Lewis base, so it could have affinity for a gas molecule with an electrophilic center, such as carbon dioxide. However, ZIF-22 is not exceptional among ZIF materials in terms of $CO_2$ adsorption; see Example 5 of the present application and see also the $CO_2$ adsorption data, reported in the aforementioned *Nature Materials* 2007 article, for ZIF-20, which is the purine counterpart of ZIF-22 (i.e., having "aza" functional groups at both the 5- and 7-positions instead of only at the 5-position. In fact, neither ZIF-22 nor ZIF-20 was even mentioned by Yaghi and his co-workers when they reviewed the $CO_2$ adsorption performance of ZIFs in "Synthesis, Structure, and Carbon Dioxide Capture Properties of Zeolitic Imidazolate Frameworks", *Accounts of Chemical Research*, Vol. 43, 2010, pp. 58-67. Without being bound by theory. ZTF-22's mediocre performance in $CO_2$ adsorption is believed to be a result of the 5-azabenzimidazole linkers within the structure not being close enough to each other, which in turn can be due to the presence of large cages in the framework type LTA (i.e. small β cages separated by large α cages). Therefore, in order to enhance $CO_2$ adsorption, it would be extremely desirable to have a ZIF composition that has the 5-azabenzimidazolate linker and a reduction in or absence of large cages, e.g. the framework type SOD (i.e., only small β cages), which has not been produced by the conventional method despite intense study on this synthesis system.

Accordingly, it would be desirable to provide methods for preparing ZIF materials affording greater control over the resulting structure, for example, affording the possibility of incorporating desired functional groups into ZIF materials having a desired framework type.

SUMMARY OF THE INVENTION

There is provided herein a method for, inter alia, obtaining improved ZIF materials with desired combinations of linker and framework type.

According to one aspect, a method is provided for exchanging or replacing at least a portion of the organic linker content of a zeolitic imidazolate framework composition. The method comprises the steps of: (a) providing a first zeolitic imidazolate framework composition having a tetrahedral framework comprising a general structure, $M^1$-$IM^a$-$M^2$, wherein $M^1$ and $M^2$ comprise the same or different metal cations, and wherein $IM^a$ is an imidazolate or a substituted imidazolate linking moiety; (b) providing a liquid composition comprising $IM^b$, wherein $IM^b$ is an imidazolate or a substituted imidazolate which is different from $IM^a$; and (c) contacting the first zeolitic imidazolate framework composition with the liquid composition under conditions sufficient to exchange at least a portion of $IM^a$ with at least a portion of $IM^b$ and to produce a second zeolitic imidazolate framework composition, $M^1$-$IM^c$-$M^2$, wherein $IM^c$ comprises or is $IM^b$.

In many desired embodiments, the framework type of the second zeolitic imidazolate framework composition can be different from the framework type obtained when a zeolitic imidazolate framework composition is prepared by crystallizing a liquid reaction mixture comprising a solution of $M^1$, $M^2$ and $IM^b$ (also called the "conventional" method herein). However, in some embodiments, the synthesis method of linker exchange may alternately include the framework type of the first zeolitic imidazolate framework composition being the same as the framework type of the second zeolitic imidazolate framework composition.

The first zeolitic imidazolate framework composition may comprise less than 1 mole percent, for example, less than 0.1 mole percent, for example, no detectable amount, of $IM^b$, based on the total moles of $IM^a$ and $IM^b$ in the first zeolitic imidazolate framework composition. Additionally or alternately, the liquid composition contacted with the first imidazolate framework composition may comprise less than 1 mole percent, for example, less than 0.1 mole percent, for example, no detectable amount, of $IM^a$, based on the total moles of $IM^a$ and $IM^b$ in the liquid composition. Further additionally or alternately, the second zeolitic imidazolate framework composition may comprise at least 10 mole percent, e.g., at least 50 mole percent, at least 90 mole percent, at least 99 mole percent, or about 100 mole percent, of $IM^b$, based on the total moles of $IM^a$ and $IM^b$ in the liquid composition.

Both of the first and second zeolitic imidazolate framework compositions may comprise, for example, at least one transition metal. The transition metal may comprise, for example, at least one of the following group of metals: Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, and Uub. In certain embodiments, both the first and second zeolitic imidazolate framework compositions may comprise at least one monovalent metal in combination with at least one trivalent metal, as described in U.S. Patent Publication No. 2010/0307336.

Both of the first and second zeolitic imidazolate framework compositions may have a framework type selected from the following group of framework types: ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAG, CAN, CAS, CDO, CFI, CGF, CGS, CHA, CHI, CLO, CON, CRB, CZP, DAC, DDR, DFO, DFT, DIA, DOH, DON, EAB, EDI, EMT, EON, EPI, ERI, ESV, ETR, EUO, EZT, FAR, FAU, FER, FRA, FRL, GIS, GIU, GME, GON, GOO, HEU, IFR, THW, ISV, ITE, ITH, ITW, TWR, IWV, IWW, JBW, KFI, LAU, LCS, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, POZ, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG, ZNI, and ZON. Particular examples of these framework types can include CRB, DFT, CAG, SOD, MER, RHO, ANA, LTA, DIA, ZNI, GME, LCS, FRL, GIS, POZ, and MOZ.

Additionally or alternately, both of the first and second zeolitic imidazolate framework compositions may be considered to be porous crystalline materials having a tetrahedral framework. The structure or basic structural unit of these frameworks may be described in terms of the following fomulae IV, V, VI, or any combination thereof:

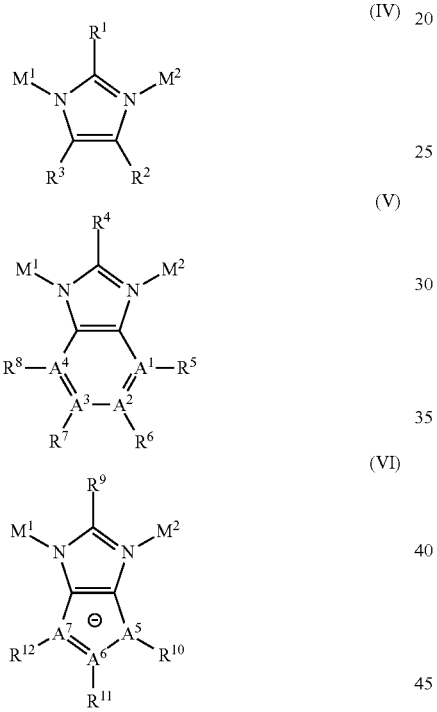

In these formulae $A^1$, $A^2$, $A^3$, and $A^4$ can each independently be selected from C, N, P, and B, and each of $A^5$, $A^6$, and $A^7$ can be either C or N. $R^5$-$R^8$ can individually be present when their corresponding $A^1$-$A^4$ comprises C. $R^1$, $R^4$, and/or $R^9$ may advantageously comprise a non-sterically hindering group that does not (substantially) interfere with the adjacent $M^1$ or $M^2$, $R^2$ and $R^3$, as well as $R^5$, $R^6$, $R^7$, and/or $R^5$, when present, may each individually be hydrogen, alkyl, halo, cyano, or nitro. $M^1$ and $M^2$ may comprise the same or different metal cation. $R^{10}$-$R^{12}$ can individually be present when their corresponding $A^5$-$A^7$ comprises C, in which case one or more of $R^{10}$-$R^{12}$ being present can optionally but advantageously be electron withdrawing groups.

According to a particular embodiment, the first zeolitic imidazolate framework composition may comprise the structure of formula IV, and the second zeolitic imidazolate framework composition may comprise the structure of formula V.

Particular examples of possible framework structures or structural units for both the first and second zeolitic imidazolate framework compositions can include formulae VII, VIII, IX, X, XI, XII, XIII, XIV, XV, XVI, XVII, and XVIII, as follows:

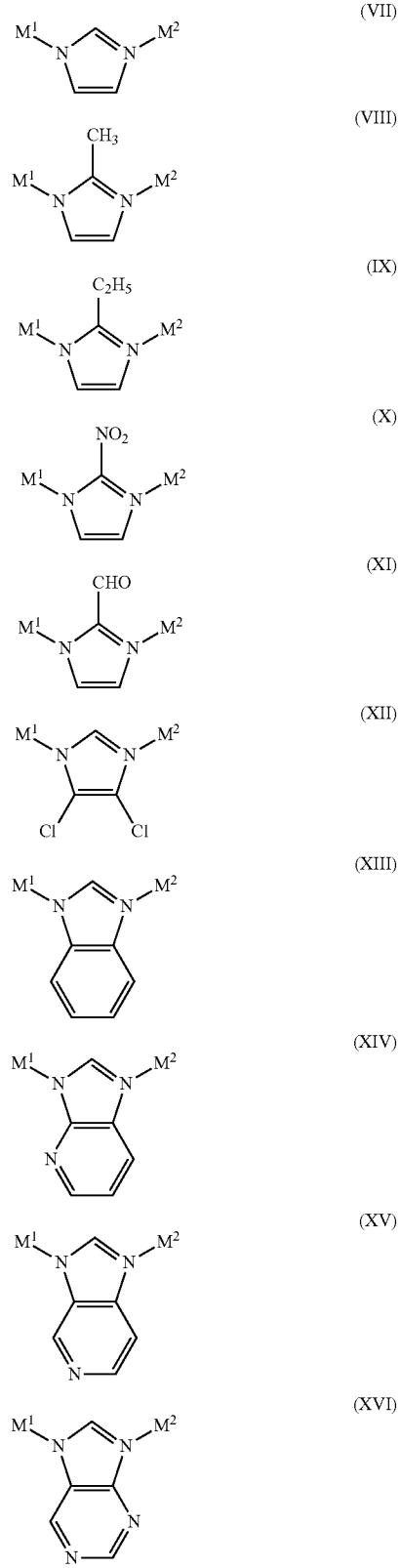

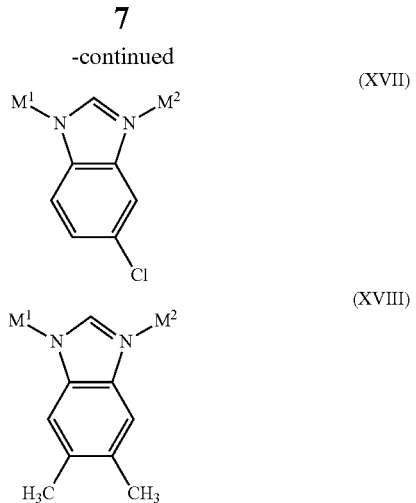

(XVII)

(XVIII)

According to particular embodiments, the first zeolitic imidazolate framework composition may comprise the structure of formulae VII, VIII, IX, X, XI, and/or XII, e.g., the structure of formula VIII, and the second zeolitic imidazolate framework composition may comprise the structure of formulae XIII, XIV, XV, XVI, XVII, and/or XVIII, e.g., the structure of formulae XIII, XIV, XV, and/or XVI, or the structure of formula XV.

$IM^b$ may advantageously comprise a functionality lacking in $IM^a$. In such a situation, such functionality may provide the second zeolitic imidazolate material with an affinity for adsorbing a gas. For example, the functionality in $IM^b$, which is lacking in $IM^a$, may be a Lewis base functionality, and the gas to be adsorbed may be a Lewis acid and/or a molecule with an electrophilic center. One non-limiting example of a Lewis base functionality is the 5-aza functionality in 5-azabenzimidazole; and a non-limiting example of a gas being a Lewis acid and/or a molecule with an electrophilic center is carbon dioxide. Alternately, the new functionality provided by $IM^b$ may include a Lewis acid functionality (e.g., where $IM^b$ contains B); and a non-limiting example of the gas to be adsorbed in that case may be a Lewis base, such as ammonia.

In a particular example of a method for replacing at least a portion of a zeolitic imidazolate framework composition, the first zeolitic imidazolate framework composition can comprise or be ZIF-8, which contains zinc and a 2-methylimidazolate linker. ZIF-8 can be contacted with a solution, for example, where the solvent comprises (is) N,N-dimethylformamide (DMF), and where the solute comprises (is) benzimidazole (i.e., the protonated form of the second linker composition, benzimidazolate). The contact of the solution with ZIF-8 can advantageously produce a second zeolitic imidazolate framework composition, which in this case can comprise (be) ZIF-7 (which contains zinc and a benzimidazolate linker).

In another example of a method for replacing at least a portion of a zeolitic imidazolate framework composition, the first zeolitic imidazole framework composition can again comprise or be ZIF-8. ZIF-8 can be contacted with a solution, e.g., where the solvent comprises (is) N,N-dimethylformamide (DMF), and where the solute comprises (is) 5-azabenzimidazole (i.e. the protonated form of the second linker composition, 5-azabenzimidazolate). The contact of the solution with ZIF-8 can advantageously produce a second zeolitic imidazolate framework composition containing zinc metal and 5-azabenzimidazolate linker, which is designated herein as EMM-19. Both ZIF-8 and EMM-19 exhibit the sodalite (SOD) framework type, whereas known ZIFs having a 5-azabenzimidazolate linker typically only exhibit the LTA framework type.

An aspect of the invention involves the production of zeolitic imidazolate framework compositions having an enhanced adsorption capacity for carbon dioxide at relatively low partial pressures. For example, there is provided a zeolitic imidazolate framework composition with (a) the SOD framework type and/or (b) the empirical formula, Zn(5-azabenzamidazolate)$_2$, wherein the zeolitic imidazolate framework composition is capable of adsorbing: (i) at least 0.30 mmol of $CO_2$ per gram of zeolitic imidazole framework composition at a temperature of ~28° C. and a $CO_2$ partial pressure of ~75 Torr; (ii) at least 0.35 mmol of $CO_2$ per gram of zeolitic imidazole framework composition at a temperature of ~28° C. and a $CO_2$ partial pressure of ~100 Torr; and/or (iii) at least 0.50 mmol of $CO_2$ per gram of zeolitic imidazole framework composition at a temperature of ~28° C. and a $CO_2$ partial pressure of ~200 Torr. An example of a ZIF material with such enhanced $CO_2$ sorption capacity at low partial pressure is EMM-19.

EMM-19 is believed to represent a new composition of matter. Accordingly, there is also provided herein a composition of matter having the empirical formula, Zn(5-azabenzimidazolate)$_2$, wherein the composition is a zeolitic imidazolate framework structure exhibiting the SOD framework type.

EMM-19 may be used in a method for adsorbing and/or separating a gas from a fluid stream. The gas to be adsorbed/separated may comprise one or more of hydrogen, nitrogen, oxygen, a noble gas, carbon monoxide, carbon dioxide, sulfur dioxide, sulfur trioxide, hydrogen sulfide, ammonia, a hydrocarbon, an amine, or some combination thereof.

BRIEF DESCRIPTION OF THE DRAWINGS

FIG. 20 is an overlay of the X-ray diffraction patterns of the as-synthesized ZIF-22 of Example 4 (top), the product of Example 14 (middle), and the as-synthesized EMM-19 of Example 2 (bottom).

DETAILED DESCRIPTION OF THE EMBODIMENTS

Figure 1:
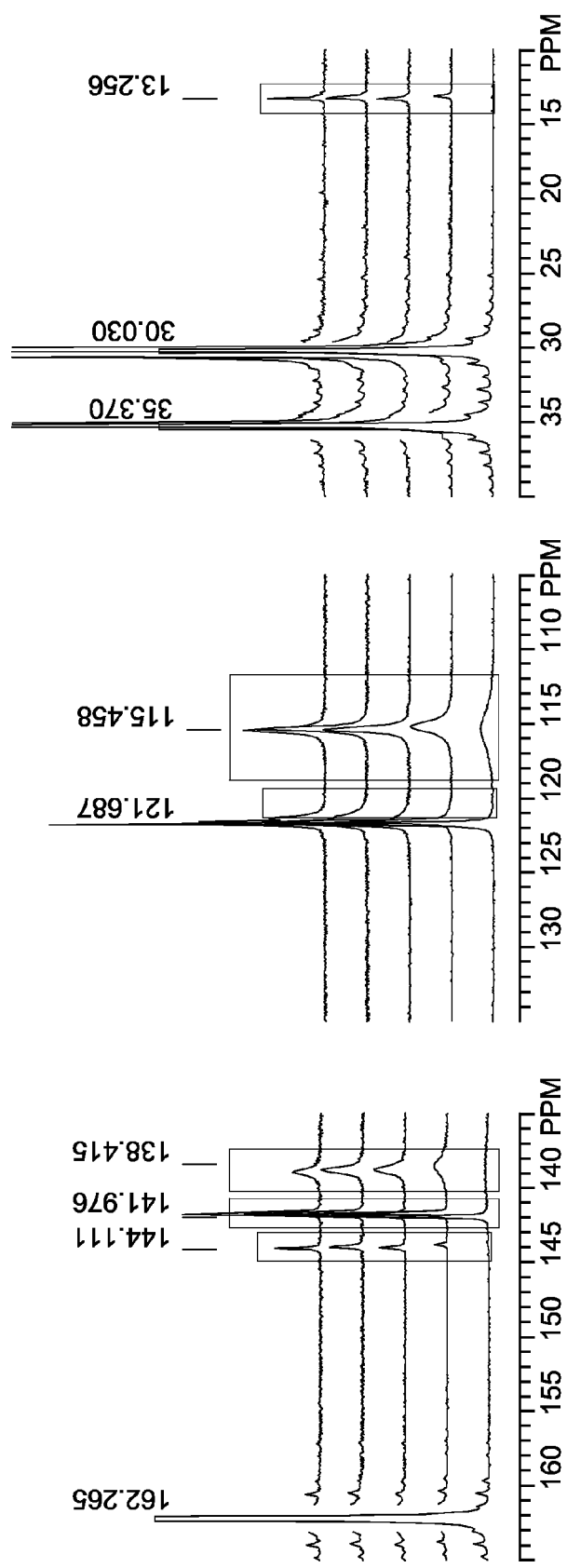
FIG. 1 shows liquid-state 125 MHz $^{13}$C NMR spectra for five materials prepared in Example 1.

Disclosed herein is a new method for making porous crystalline materials, which are known in the art as zeolitic imidazolate framework (ZIF) compositions. These ZIF materials may be described as having a tetrahedral framework comprising a general structure, $M^1$-IM-$M^2$, wherein $M^1$ and $M^2$ comprises the same or different metal, and wherein IM is an imidazolate or a substituted imidazolate linking moiety. Though the term "imidazolate" is used to describe IM, IM$^a$, and IM$^b$ herein, it is noted that, at various stages in the methods according to the invention, the relevant IM/IM$^a$/IM$^b$ may be an imidazole (neutral charge) at particular times in the reaction sequence(s); nevertheless, the fact that these components are described using the term "imidazolate" is merely for convenience and uniformity and should be understood to encompass both situations where they are holding/delocalizing a charge and where they are neutral. In the method described herein, at least a portion of linking moiety (IM) in an existing ZIF material can be replaced or exchanged with another linking moiety by an exchange process. Also disclosed herein is a new material designated herein as EMM-19, and a method of using EMM-19 to adsorb and/or separate gases, such as carbon dioxide.

All publications specifically referred to herein with respect to their relevant teachings concerning aspects of the invention(s) disclosed herein are hereby incorporated by reference in their entirety, as well as with specificity to the element(s) for which they were cited herein.

A. Introduction

Typical synthetic routes for ZIF materials disclosed in the literature are summarized below in Scheme 1, wherein M is a transition metal, typically in the form of a divalent cation, such as $Zn^{2+}$, $Co^{2+}$, $Fe^{2+}$, present in a metal salt starting material that is typically soluble in the synthesis solvent, wherein IM is imidazolate or a substituted imidazolate linker, wherein H-IM is the corresponding neutral molecule of IM, i.e., the protonated form of IM, wherein $M^1$ and $M^2$ are two metals of different valency, wherein $M^1$ is typically a monovalent cation, such as $Li^+$, $Cu^+$, $Ag^+$, present in a metal salt starting material that is typically soluble in the synthesis solvent, and wherein $M^2$ is typically a trivalent metal, such as $B^{3+}$, $Al^{3+}$, $Ga^{3+}$, present in an anionic mononuclear complex tetrakis(1-imidazolyl)metallate with an overall −1 charge. These synthetic routes are referred to herein as "the conventional method".

Scheme 1

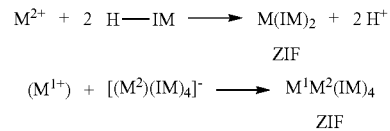

An alternate route of ZIF synthesis is described herein. This alternate route is based on exchanging the IM linkers in an existing ZIF material, as shown below in Scheme 2, wherein ZIF$^a$ is a starting material and ZIF$^b$ is a product, wherein M is typically a divalent transition metal, and wherein $M^1$ and $M^2$ are typically a monovalent and a trivalent metal, respectively. These alternate synthetic routes are referred to herein as "the exchange method".

Scheme 2

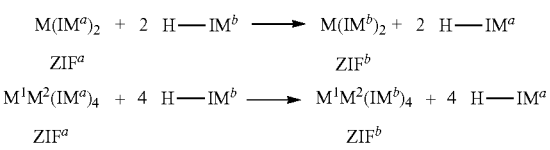

It should be understood that the H-IM$^b$ as shown in Scheme 2 above may be replaced, in whole or in part, by other sources of IM$^b$, such as salts of IM$^b$.

By employing an existing ZIF as a (solid) starting material, the exchange method can potentially overcome some of the intrinsic limitations of the conventional method for ZIF synthesis. For example, in the conventional method, the introduction of functional group(s) into an IM linker could lead to interactions between these moieties and could therefore cause the formation of specific oligomeric structures in the reaction mixture, which in turn would limit the framework types of ZIF product. However, such a limitation could be circumvented by exchanging such a functionalized linker into a pre-formed ZIF with a desired framework type. Additionally or alternatively, in a conventional synthesis, the use of a functionalized IM linker with substituent(s) participating in the coordination to metal ions could disrupt the coordination pattern needed for the formation of ZIF frameworks, which could thus lead to non-porous framework structures or even discrete molecular complexes. However, without being bound by theory, the interference of coordinating functional groups would be expected to be greatly reduced when such a functionalized linker is exchanged into a pre-formed ZIF structure. Further additionally or alternatively, the deprotonation of H-IM, which may be a key factor controlling the kinetics and thermodynamics of ZIF formation, can be conveniently tuned in the exchange method by judicious choice of IM linker in the ZIF starting material.

It is worth noting that works on linker exchange in metal-organic frameworks (MOFs) have appeared in the scientific literature. Noticeably, Cohen et al. and Choe et al. have respectively reported the exchange of dicarboxylate- and bipyridine-type organic linkers in MOFs. See "Postsynthetic Ligand Exchange as a Route to Functionalization of 'Inert' Metal-Organic Frameworks". *Chemical Science*, Vol. 3, 2012, pp. 126-30, and "Stepwise Synthesis of Metal-Organic Frameworks: Replacement of Structural Organic Linkers", *Journal of the American Chemical Society*, Vol. 133, 2011, pp. 9984-7. What is common in these works is the fact that they deal with relatively weak metal-linker interactions and/or very open framework structures. However, ZIFs are a unique type of substrate for linker exchange for two reasons: (a) the metal-imidazolate interaction, M-IM-M, is typically strong, evidenced by the exceptional chemical and thermal stability of ZIFs; and (b) the framework structures of ZIFs can often feature large cages connected through very small windows, which can tend to complicate the transport of reactants, especially bulky functionalized H-IM molecules. These two points have been established in the pioneering works by Yaghi and co-workers. See, for example, "Exceptional Chemical and Thermal Stability of Zeolitic Imidazolate Frameworks", *Proceedings of the National Academy of Sciences of U.S.A.*, Vol. 103, 2006, pp. 10186-91; "Zeolite A Imidazolate Frameworks", *Nature Materials*, Vol. 6, 2007, pp. 501-6; and "Colossal Cages in Zeolitic Imidazolate Frameworks as Selective Carbon Dioxide Reservoirs", *Nature*, Vol. 453, 2008, pp. 207-12.

One specific example of the intrinsic limitations of the conventional method for ZIF synthesis can be found in the aforementioned "Zeolite A Imidazolate Frameworks", *Nature Materials*, Vol. 6, 2007, pp. 501-6, by Yaghi et al. This article reports a systematic study on three conventional ZIF syntheses using purine, 5-azabenzimidazole, and 4-azabenzimidazole as organic linker, respectively (Scheme 3). After exploring a wide synthesis space, including linker/metal molar ratio (from 5 to 10), metal concentration (from 0.05 to 0.2 mol/L), metal source (zinc nitrate and cobalt nitrate), crystallization temperature (from 65° C. to 150° C.), crystallization time (from 1 to 3 days), and addition of base (2 mol/L dimethylamine solution in ethanol), the authors observed that the system employing 4-azabenzimidazole linkers always yielded a non-porous ZIF with the framework type DIA (short for diamond), whereas the ones employing purine and 5-azabenzimidazole linkers always produced porous ZIF materials with the framework type LTA (short for Linde type A). The result was corroborated in a recent comprehensive review article by Yaghi et al.; see Table 1 in "Synthesis, Structure, and Carbon Dioxide Capture Properties of Zeolitic Imidazolate Frameworks", *Accounts of Chemical Research*, Vol. 43, 2010, pp. 58-67. In the *Nature Materials* 2007 article, the authors attributed the finding, based on crystallographic data, to favorable intermolecular interactions resulting from the polarity of C—N bond at the 5- and 6-positions in purine and 5-azabenzimidazole (Scheme 4) and the lack thereof in 4-azabenzimidazole. Such attractive interactions were theorized to stabilize double 4-ring (D4R), a crucial building unit for the framework type LTA.

Scheme 3

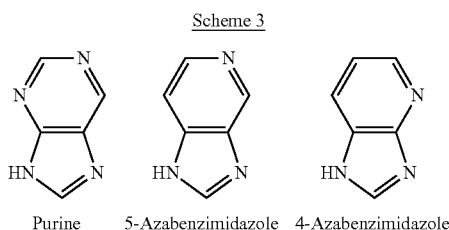

Purine   5-Azabenzimidazole   4-Azabenzimidazole

Scheme 4

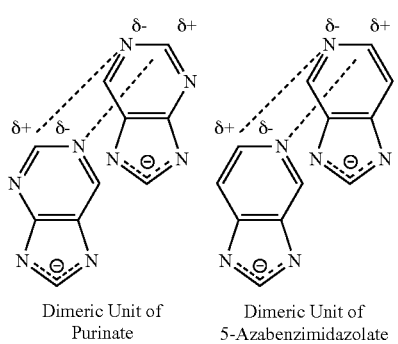

Dimeric Unit of Purinate   Dimeric Unit of 5-Azabenzimidazolate

As shown herein, by using the exchange method, it can be possible to circumvent the formation of D4R units and use 5-azabenzimidazole to synthesize a new ZIF material with a framework type different from that obtained by the conventional method (a "non-equilibrium" framework), i.e., the framework type SOD (short for sodalite) instead of LTA, which is a framework type wherein β-cages are connected by directly sharing 4-rings rather than through D4R units. Specifically, one example of this non-equilibrium framework type can be achieved by exchanging 5-azabenzimidazole into a well-known, commercially-available ZIF-8 material, a Zn(2-methylimidazolate)$_2$ with the framework type SOD. The new composition disclosed herein, i.e., a Zn(5-azabenzimidazolate)$_2$ with the non-equilibrium framework type SOD, is referred to herein as EMM-19.

EMM-9 has been found to exhibit desirable gas adsorption properties. The uses of ZIFs for gas storage and separation have been documented in a PCT Publication by Yaghi and co-workers (WO 2008/140788, entitled "Adsorptive Gas Separation of Multi-Component Gases") and a series of publications by Reyes, Ni, and co-workers (U.S. Patent Application Publication Nos. 2009/0211440 entitled "Separation of Hydrogen from Hydrocarbons Utilizing Zeolitic Imidazolate Framework Materials"; 2009/0211441 entitled "Separation of Carbon Dioxide from Methane Utilizing Zeolitic Imidazolate Framework Materials"; 2009/0214407 entitled "Separation of Carbon Dioxide from Nitrogen Utilizing Zeolitic Imidazolate Framework Materials"; and 2009/0216059 entitled "Separation of Methane from Higher Carbon Number Hydrocarbons Utilizing Zeolitic Imidazolate Framework Materials"). The most striking example disclosed in the works by Reyes, Ni, and co-workers can be seen in the room-temperature $CO_2$ adsorption isotherm of ZIF-7, a Zn(benzimidazolate)$_2$ with the framework type SOD. The isotherm has a hysteretic shape and features a sharp rise in the adsorption branch starting at a low $CO_2$ partial pressure of 60 kPa (0.6 atm), which is indicative of a structural transition induced by favorable framework-$CO_2$ interactions and makes ZIF-7 a promising material for $CO_2$ separation. We have now found that, by incorporating a basic heteroatom such as nitrogen into the linker of ZIF-7, e.g., by exchanging benzimidazolate with 5-azabenzimidazolate to produce EMM-19, the framework-$CO_2$ interactions can be enhanced, and the threshold partial pressure for favorable $CO_2$ adsorption can be further reduced.

B. The Linker Exchange Method

In a step of the exchange method described herein, a first zeolitic imidazolate framework composition can be provided or selected. The first zeolitic imidazolate framework composition ($ZIF^1$) can have a first organic linker composition ($IM^a$). Unreacted species or impurities can preferably be removed from the as-synthesized form of $ZIF^1$ prior to exchange with a second organic linker composition ($IM^b$). These unreacted species or impurities may be removed by appropriate techniques, e.g., involving washing and drying. For example, the as-synthesized form of $ZIF^1$ may be washed with a suitable solvent, such as DMF, followed by solvent exchange with ethanol, acetonitrile, or the like, decanting solvent and drying, for example, under vacuum at ~250° C. A first zeolitic imidazolate framework composition sufficiently (substantially) free of unreacted species or impurities may be purchased from commercial vendors.

In another step of the method, a liquid composition comprising a second organic linker composition ($IM^b$) can be provided. The second organic linker composition may be present in a liquid composition, for example, in the form of the protonated form of the imidazolate type linker composition and/or in the form of a salt of the imidazolate type linker composition. This protonated form of the imidazolate type linker composition is referred to herein as H-$IM^b$. The second organic linker composition ($IM^b$) can be different from the first organic linker composition ($IM^a$) in many embodiments. $IM^b$ may advantageously comprise a functionality lacking in $IM^a$.

The liquid composition may comprise a solution of the second organic linker composition ($IM^b$) in a solvent. The solvent may be a polar organic solvent, such as N,N-dimethylformamide (DMF), N,N-diethylformamide (DEF), N,N-dimethylacetamide (DMAc), 1,3-dimethylpropyleneurea (DMPU), a sulfoxide (e.g., dimethylsulfoxide or DMSO), a phosphoramide (e.g., hexamethylphosphoramide), acetonitrile (MeCN), triethylamine (TEA), or a combination thereof. Alternatively, though not strictly organic, aqueous solvents such as aqueous ammonia and ethanol mixtures, can be used as solvents for the linker composition(s).

Though polar organic compounds such as N,N-dimethylformamide (DMF) are suggested as solvents herein, it should be understood that a solvent (or solvent system) useful in the methods according to the invention and/or useful in making products according to the invention should at least be able to solvate and/or solubilize the reactants to the extent necessary to allow reaction to occur at a reasonable rate (or over a reasonable reaction time). They can also typically be present in a substantially liquid phase at operating/reaction conditions (and optionally but preferably also at STP). Additionally, in the case of synthesis of certain ZIFs, the solvent system may need to include a Brønsted or Lewis base (hydrogen acceptor) component, in order for the reaction to proceed (for instance in, but not limited to, cases where one component of the solvent is not sufficiently basic). Whether that Brønsted or Lewis base component comprises a portion of the single solvent molecule itself or includes a separate component having hydrogen acceptor functionality is not necessarily critical. It should further be understood that these aspects of the solvent (solvent system) may be equally applicable to "conventional" (solvothermal, etc.) syntheses as well as to the linker exchange synthesis methods detailed herein, as the aforementioned aspects can advantageously relate generally to ZIF and/or MOF synthesis reactions.

In certain embodiments, solvents (and/or solvent systems) particularly useful in the invention can additionally or alternately exhibit a relatively high vapor pressure and/or a relatively low boiling point. For instance, in some such embodiments, a relatively high vapor pressure can represent at least 2.5 kPa at about 20° C., for example at least about 3.0 kPa at about 20° C., at least about 3.5 kPa at about 20° C., at least about 4.0 kPa at about 20° C., at least about 4.5 kPa at about 20° C., at least about 5.0 kPa at about 20° C., at least about 5.5 kPa at about 20° C., at least about 6.0 kPa at about 20° C., at least about 6.5 kPa at about 20° C., at least about 7.0 kPa at about 20° C., at least about 7.5 kPa at about 20° C., at least about 8.0 kPa at about 20° C., at least about 8.5 kPa at about 20° C., at least about 9.0 kPa at about 20° C., or at least about 9.5 kPa at about 20° C. Optionally, if an upper bound on vapor pressure is needed and/or desired, the relatively high vapor pressure can be about 30 kPa or less at about 20° C., e.g., about 25 kPa or less at about 20° C., about 20 kPa or less at about 20° C., about 15 kPa or less at about 20° C., or about 10 kPa or less at about 20° C. Additionally or alternately, in some such embodiments, a relatively low boiling point can represent 99° C. or less, e.g., about 98° C. or less, about 96° C. or less, about 95° C. or less, about 93° C. or less, about 91° C. or less, about 90° C. or less, about 88° C. or less, about 86° C. or less, about 85° C. or less, about 83° C. or less, about 81° C. or less, or about 80° C. or less. Optionally, if a lower bound on boiling point is needed and/or desired (preferably, the solvent can have a boiling point above ambient temperature, so as to be in a liquid phase), the relatively low boiling point can be at least about 25° C., e.g., at least about 30° C. at least about 35° C., at least about 40° C., at least about 45° C., at least about 50° C., at least about 55° C., at least about 60° C., at least about 65° C., at least about 70° C., at least about 75° C., or at least about 80° C. One such non-limiting example of a solvent system having both a relatively low boiling point and a relatively high vapor pressure includes a mixture of acetonitrile and triethylamine.

In another step of the method, the first zeolitic imidazolate framework composition ($ZIF^1$) can be contacted with the liquid composition comprising $IM^b$. This contact may take place by combining (1) the first $ZIF^1$, (2) the solvent, and (3) a source of $IM^b$, such as H-$IM^b$, in any order. For example, $ZIF^1$ and H-$IM^b$ may first be combined, and the solvent may be added to this combination, accomplishing the simultaneous formation of a liquid composition comprising H-$IM^b$ and contact of this composition with $ZIF^1$. In a convenient embodiment, the source of $IM^b$ can first be dissolved in the solvent, and either the resulting solution can be added to $ZIF^1$ or $ZIF^1$ can be added to the solution.

The molar ratio of the first organic linker ($IM^a$) in the first ZIF ($ZIF^1$) to $IM^b$ in the contacted or combined mixture of $ZIF^1$ with the liquid mixture comprising $IM^b$ may be from 0.1 to 20, e.g., from 0.1 to 15, from 0.1 to 10, from 0.1 to 7, from 0.1 to 5, from 0.1 to 3, from 0.1 to 2, from 0.1 to 1.5, from 0.2 to 20, from 0.2 to 15, from 0.2 to 10, from 0.2 to 7, from 0.2 to 5, from 0.2 to 3, from 0.2 to 2, from 0.2 to 1.5, from 0.3 to 20, from 0.3 to 15, from 0.3 to 10, from 0.3 to 7, from 0.3 to 5, from 0.3 to 3, from 0.3 to 2, from 0.3 to 1.5, from 0.5 to 20, from 0.5 to 15, from 0.5 to 10, from 0.5 to 7, from 0.5 to 5, from 0.5 to 3, from 0.5 to 2, from 0.5 to 1.5, from 0.8 to 20, from 0.8 to 15, from 0.8 to 10, from 0.8 to 7, from 0.8 to 5, from 0.8 to 3, from 0.8 to 2, from 0.8 to 1.5, from 1 to 20, from 1 to 15, from 1 to 10, from 1 to 7, from 1 to 5, from 1 to 3, from 1 to 2, from 1 to 1.5, from 1.5 to 20, from 1.5 to 15, from 1.5 to 10, from 1.5 to 7, from 1.5 to 5, from 1.5 to 3, from 1.5 to 2, from 2 to 20, from 2 to 15, from 2 to 10, from 2 to 7, from 2 to 5, or from 2 to 3. When complete or substantially (e.g., at least 90%) complete exchange of $IM^a$ with $IM^b$ is desired, the molar ratio of $IM^b$ to H-$IM^a$ may advantageously be at least 1, e.g., at least 1.2, at least 1.5, or at least 2.

The combined mixture of $ZIF^1$ with the liquid composition comprising $IM^b$ can be maintained under conditions sufficient to achieve at least partial exchange of $IM^a$ with $IM^b$, thereby effectively converting $ZIF^1$ at least partially into $ZIF^2$. The contact may take place for a sufficient time to achieve at least partial exchange, e.g., from at least 1 hour to as much as 10 days, from 1 hour to 7 days, from 1 hour to 5 days, from 1 hour to 3 days, from 2 hours to 10 days, from 2 hours to 7 days, from 2 hours to 5 days, from 2 hours to 3 days, from 4 hours to 10 days, from 4 hours to 7 days, from 4 hours to 5 days, from 4 hours to 3 days, from 8 hours to 10 days, from 8 hours to 7 days, from 8 hours to 5 days, from 8 hours to 3 days, from 12 hours to 10 days, from 12 hours to 7 days, from 12 hours to 5 days, from 12 hours to 3 days, from 18 hours to 10 days, from 18 hours to 7 days, from 18 hours to 5 days, from 18 hours to 3 days, from 24 hours to 10 days, from 24 hours to 7 days, from 24 hours to 5 days, or from 24 hours to 3 days. The temperature of the combined mixture of $ZIF^1$ with the liquid composition comprising $IM^b$ may range, for example, from a temperature of about −78° C. (dry-ice bath temperature) to the boiling temperature of the solvent (the normal boiling point of N,N-dimethylformamide is about 153° C.), from about 0° C. (ice water bath temperature) to at least 10° C. below the boiling temperature of the solvent, or from about 15° C. to at least 15° C. below the boiling temperature of the solvent (or alternately to about 100° C.). When contact takes place in a pressurized vessel, the temperature may exceed the boiling temperature of the solvent. For example, the contact may take place at room temperature or greater, such as from about 18° C. to about 200° C. or from about 75° C. to about 150° C. In certain embodiments where complete or substantially (e.g., 90% or greater) complete exchange of $IM^a$ with $IM^b$ is desired, the time of contact may be from 20 hours to 72 hours and the temperature of contact may be from 130° C. to 150° C.

After $ZIF^1$ is exchanged with $IM^b$ to form $ZIF^2$, the $ZIF^2$ may be recovered and treated, if necessary or desired (e.g., to remove molecules from the pore space of the $ZIF^2$). This treatment may involve techniques for activating the as-synthesized form of a ZIF prepared by solvothermal methods, for example, as described in U.S. Patent Application Publication Nos. 2007/0202038 and 2009/0211440. For example, the recovered $ZIF^2$ may be washed with DMF, solvent exchanged with acetonitrile (e.g., 3 exchanges in ~3 days) and dried, for example, under vacuum at about 200° C. for ~3 hours. The dried product may then be soaked in acetonitrile, e.g., at ~75° C. for ~24 hours, followed by a final rinse with fresh acetonitrile, to produce the acetonitrile-exchanged product. Finally the acetonitrile-exchanged product may be placed under vacuum, e.g., less than about 10 mTorr at ~70° C. for about 10-18 hours, to yield the activated form of $ZIF^2$.

$M^1$ and $M^2$ may be one or more transition metals as described for ZIFs in U.S. Patent Application Publication No. 2007/0202038. Such transition metals can include, but are not necessarily limited to, Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, and Uub.

$M^1$ and $M^2$ may additionally or alternately comprise other metals. For example, as described in U.S Patent Application Publication No. 2010/0307336, $M^1$ may be a metal having a first valency, and $M^2$ may be a metal having a second valency different from said first valency.

In one such embodiment, $M^1$ may be a monovalent metal cation, including $Li^+$, $N^+$, $K^+$, $Cs^+$, $Rb^+$, $Cu^+$, $Ag^+$, and/or $Au^+$ (e.g., including or being $Li^+$, $Cu^+$, and/or $Ag^+$, particularly including or being $Li^+$). Additionally or alternately, in such an embodiment, $M^2$ may be a trivalent element cation, including $B^{3+}$, $Al^{3+}$, $Ga^{3+}$, $In^{3+}$, $Fe^{3+}$, $Cr^{3+}$, $Sc^{3+}$, $Y^{3+}$, and/or $La^{3+}$, wherein La is any lanthanide metal (e.g., including $B^{3+}$, $Al^{3+}$, and/or $Ga^{3+}$, particularly including $B^{3+}$).

In certain embodiments, $M^1$ and $M^2$ may both be the same. When $M^1$ and $M^2$ are both the same, they may advantageously comprise or be a transition metal, for example Zn.

The zeolitic imidazolate framework materials described herein, e.g. $ZIF^1$ and $ZIF^2$, may have a tetrahedral framework comprising a structure selected from the group consisting of IV, V, VI, or any combination thereof:

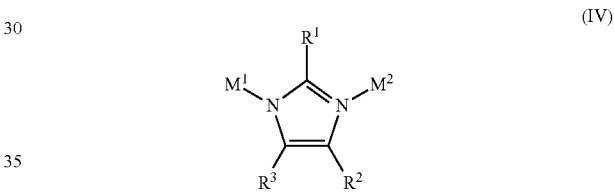

(IV)

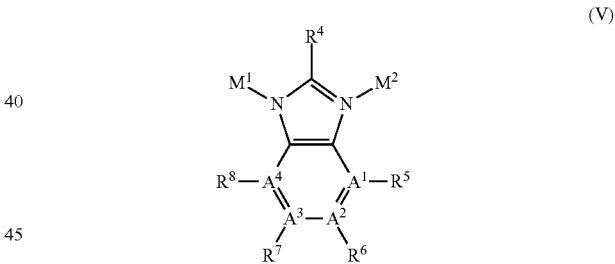

(V)

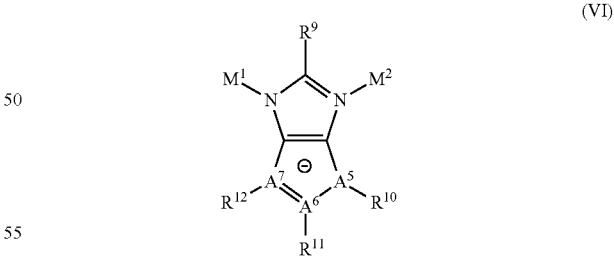

(VI)

wherein $A^1$, $A^2$, $A^3$, and $A^4$ can each independently be selected from the group of elements consisting of C, N, P, and B, and each of $A^5$, $A^6$, and $A^7$ can be either C or N; wherein $R^5$-$R^8$ can individually be present when their corresponding $A^1$-$A^4$ comprises C; wherein $R^1$, $R^4$, and/or $R^9$ may advantageously comprise a non-sterically hindering group that does not (substantially) interfere with the adjacent $M^1$ or $M^2$; wherein $R^2$ and $R^3$, as well as $R^5$, $R^6$, $R^7$, and/or $R^8$, when present, may each individually be hydrogen, alkyl, halo, cyano, or nitro; wherein $M^1$ and $M^2$ may comprise the same or different metal cation; and wherein $R^{10}$-$R^{12}$ can individually be present when their corresponding $A^5$-$A^7$ comprises C, in which case one or more of $R^{10}$-$R^{12}$ being present can optionally but advantageously be electron withdrawing groups.

In one embodiment, each of $R^1$, $R^4$, and $R^9$ can be independently selected from hydrogen, methyl, ethyl, nitro, formyl, halo, and cyano groups.

Suitable electron withdrawing groups for each of $R^{10}$, $R^{11}$, and $R^{12}$ can include, but are not necessarily limited to nitro, cyano, fluoro, and chloro groups.

According to an example of a particular embodiment, the first zeolitic imidazolate framework composition may comprise the structure of formula IV, and the second zeolitic imidazolate framework composition may comprise the structure of formula V.

Examples of family members of the zeolitic imidazolate framework materials described herein can comprise structures selected from the group consisting of VII, VIII, IX, X, XI, XII, XIII, XIV, XV, XVI, XVII, XVIII, and combinations thereof:

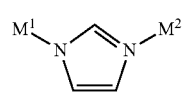
(VII)

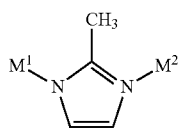
(VIII)

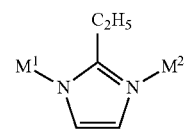
(IX)

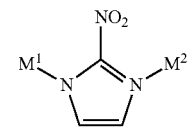
(X)

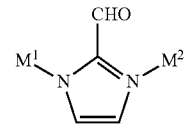
(XI)

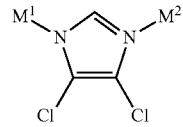
(XII)

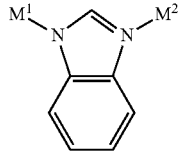
(XIII)

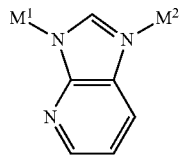
(XIV)

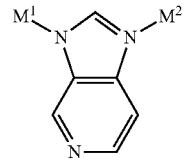
(XV)

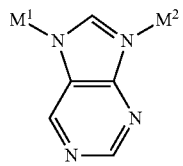
(XVI)

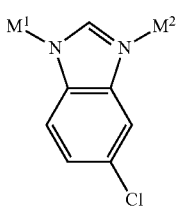
(XVII)

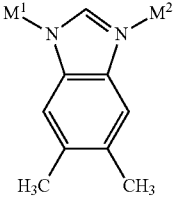
(XVIII)

The imidazolate linking moieties in the above formulae have been successfully used in the conventional syntheses of ZIFs, for example as reported by Yaghi and his co-workers in the following publications: "Exceptional Chemical and Thermal Stability of Zeolitic Imidazolate Frameworks", *Proceedings of the National Academy of Sciences of U.S.A.*, Vol. 103, 2006, pp. 10186-91; "Zeolite A Imidazolate Frameworks", *Nature Materials*, Vol. 6, 2007, pp. 501-6; "High-Throughput Synthesis of Zeolitic Imidazolate Frameworks and Application to $CO_2$ Capture", *Science*, Vol. 319, 2008, pp. 939-43; "Colossal Cages in Zeolitic Imidazolate Frameworks as Selective Carbon Dioxide Reservoirs", *Nature*, Vol. 453, 2008, pp. 207-12; and "Crystals as Molecules: Postsynthesis Covalent Functionalization of Zeolitic Imidazolate Frameworks", *Journal of the American Chemical Society*, Vol. 130, 2008, pp. 12626-7, inter alia.

According to examples of particular embodiments of the exchange method described herein, the first zeolitic imidazolate framework composition may comprise a structure of formulae VII, VIII, IX, X, XI, and/or XII (e.g., the structure of formula VIII), and the second zeolitic imidazolate framework composition may comprise a structure of formulae XIII, XIV, XV, XVI, XVII, and/or XVIII (e.g., of formulae XIII, XIV, XV, and/or XVI, or of formula XV).

C. ZIF Structures and Uses

The zeolitic imidazolate framework materials disclosed herein may have tetrahedral framework structures of any type. The framework types of the zeolitic imidazolate framework materials are denoted herein by a code consisting of three upper-case letters, in a similar manner to that used in the zeolite literature. It must be pointed out that a system of three-lower-case-letter symbols was introduced by O'Keeffe and Yaghi for the designation of the framework types of metal-organic frameworks (MOFs), meta-organic polyhedra (MOPs), zeolitic imidazolate frameworks (ZIFs), and covalent-organic frameworks (COFs). General information about the latter can be found, for example, in the publication by O'Keeffe and Yaghi et al., "Reticular Chemistry: Occurrence and Taxonomy of Nets and Grammar for the Design of Frameworks", *Accounts of Chemical Research*, Vol. 38, 2005, pp. 176-82, and at http://rcsr.anu.edu.au/home, the Reticular Chemistry Structure Resource (RCSR) website. For the purpose of uniformity, all framework type codes used in this publication are in upper-case letters. It is also noted that the concepts "framework type", "framework structure", "topology", and "net" are used essentially interchangeably in the relevant literature.

ZIFs can include such structures iso-structural to known zeolites and related minerals, as well as structures unique to the field of ZIFs, for example, those identified in U.S. Patent Application Publication Nos. 2007/0202038 and 2010/0307336, including ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAG, CAN, CAS, CDO, CFI, CGF, CGS, CHA, CHI, CLO, CON, CRB, CZP, DAC, DDR, DFO, DFT, DIA, DOH, DON, EAB, EDI, EMT, EON, EPI, ERI, ESV, ETR, EUO, EZT, FAR, FAU, FER, FRA, FRL, GIS, GIU, GME, GON, GOO, HEU, IFR, IHW, ISV, ITE, ITH, ITWV, IWR, IWV, TWW, JBW, KFI, LAU, LCS, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, POZ, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG, ZNI, and ZON. Such structures can include a tetrahedral framework type selected from the group consisting of CRB, DFT, CAG, SOD, MER, RHO, ANA, LTA, DIA, ZNI, GME, LCS, FRL, GIS, POZ, MOZ, and combinations thereof.

The present porous crystalline materials in the as-synthesized form can generally contain guest species, typically solvent and/or template molecules, within the tetrahedral frameworks. The guest species can be removed, e.g., by evacuation at a relatively low pressure (such as less than 50 mTorr) and optionally but typically at a temperature from about 70° C. to about 300° C., or alternately by exchange with an organic solvent of relatively small molecular size (e.g., acetonitrile), followed by evacuation, such as using the previously described process. The removal of guest species can result in an increase in internal pore volume that can be used to adsorb various gases, such as carbon dioxide, carbon monoxide, sulfur dioxide, sulfur trioxide, hydrogen sulfide, hydrocarbons, hydrogen, nitrogen, oxygen, noble gases, ammonia, amines, or combinations thereof.

Zeolitic imidazolate framework materials, e.g., prepared by the exchange method described herein, such as those having the SOD framework type and/or the empirical formula of Zn(5-azabenzimidazole)$_2$, may have unique carbon dioxide sorption capacities. For example, under conditions comprising a temperature of 28° C., the zeolitic imidazolate framework material may sorb: (i) at least 0.30 mmol of $CO_2$ per gram of zeolitic imidazole framework composition (e.g., at least 0.35 mmol/g, at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, or at least 1.0 mmol/g) at a $CO_2$ partial pressure of ~75 Torr (ii) at least 0.35 mmol of $CO_2$ per gram of zeolitic imidazole framework composition (e.g., at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, or at least 1.3 mmol/g) at a $CO_2$ partial pressure of ~100 Torr; and/or (iii) at least 0.50 mmol of $CO_2$ per gram of zeolitic imidazole framework composition (e.g. at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, at least 1.3 mmol/g, at least 1.4 mmol/g, at least 1.5 mmol/g, at least 1.6 mmol/g, at least 1.7 mmol/g, or at least 1.8 mmol/g) at a $CO_2$ partial pressure of ~200 Torr. Though there is not necessarily an upper limit on $CO_2$ sorption capacity, at the relatively low partial pressures listed here, the zeolitic imidazolate framework materials according to the invention can typically sorb up to 5 mmol/g $CO_2$.

Additionally envisioned are ZIF materials, e.g., prepared by the exchange method described herein, such as those having the SOD framework type and/or the empirical formula of Zn(5-azabenzimidazole)$_2$, that additionally contain at least 0.30 mmol of sorbed $CO_2$ per gram of zeolitic imidazole framework composition (e.g., at least 0.35 mmol/g, at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, at least 1.3 mmol/g, at least 1.4 mmol/g, at least 1.5 mmol/g, at least 1.6 mmol/g, at least 1.7 mmol/g, at least 1.8 mmol/g, at least 1.9 mmol/g, at least 2.0 mmol/g, at least 2.1 mmol/g, at least 2.2 mmol/g, at least 2.3 mmol/g, at least 2.4 mmol/g, or at least 2.5 mmol/g).

Additionally or alternately, the present invention can include one or more of the following embodiments.

Embodiment 1

A method for exchanging imidazolate linker in a zeolitic imidazolate framework composition, said method comprising the steps of: (a) providing a first zeolitic imidazolate framework composition having a tetrahedral framework comprising a general structure, $M^1$-$IM^a$-$M^2$, wherein $M^1$ and $M^2$ comprise the same or different metal cations, and wherein $IM^a$ is an imidazolate or a substituted imidazolate linking moiety; (b) providing a liquid composition comprising $IM^b$, wherein $IM^b$ is an imidazolate or a substituted imidazolate which is different from $IM^a$; and (c) contacting the first zeolitic imidazolate framework composition with the liquid composition under conditions sufficient to exchange at least a portion of $IM^a$ with at least a portion of $IM^b$ and to produce a second zeolitic imidazolate framework composition, $M^1$-$IM^c$-$M^2$, wherein $IM^c$ comprises $IM^b$, and wherein the framework type of the second zeolitic imidazolate framework composition is different from the framework type obtained when a zeolitic imidazolate framework composition is prepared by crystallizing a liquid reaction mixture comprising a solution of $M^1$, $M^2$ and $IM^b$.

Embodiment 2

A method according to embodiment 1, wherein the framework type of the first zeolitic imidazolate framework composition is the same as the framework type of the second zeolitic imidazolate framework composition and/or wherein both of the first and second zeolitic imidazole framework compositions comprise at least one transition metal (e.g., selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, Uub, and combinations thereof).

Embodiment 3

A method according to embodiment 1 or embodiment 2, wherein the first zeolitic imidazolate framework composition comprises less than 1 mole percent of $IM^b$, based on the total moles of $IM^a$ and $IM^b$ in the first zeolitic imidazolate framework composition, wherein the liquid composition comprises less than 1 mole percent of $IM^a$, based on the total moles of $IM^a$ and $IM^b$ in the liquid composition, and wherein the second zeolitic imidazolate framework composition comprises at least 10 mole percent (e.g., at least 50 mole percent or at least 90 mole percent) of $IM^b$, based on the total moles of $IM^a$ and $IM^b$ in the second zeolitic imidazolate framework composition.

Embodiment 4

A method according to any one of the previous embodiments, wherein both of the first and second zeolitic imidazolate framework compositions: have a framework type selected from the group consisting of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAG, CAN, CAS, CDO, CFI, CGF, CGS, CHA, CHI, CLO, CON, CRB, CZP, DAC, DDR, DFO, DFT, DIA, DOH, DON, EAB, EDI, EMT, EON, EPI, ERI, ESV, ETR, EUO, EZT, FAR, FAU, FER, FRA, FRL, GIS, GIU, GME, GON, GOO, HEU, IFR, IHW, ISV, ITE, ITH, ITW, IWR, IWV, IWW, JBW, KFI, LAU, LCS, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, POZ, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG, ZNI, ZON, and combinations thereof (e.g. selected from the group consisting of CRB, DFT, CAG. SOD, MER, RHO, ANA, LTA, DIA, ZNI, GME, LCS, FRL, GIS, POZ, MOZ, and combinations thereof); are porous crystalline materials having a tetrahedral framework comprising a structure selected from the group consisting of IV, V, VI, or any combination thereof:

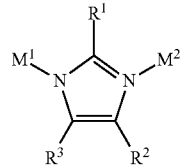

(IV)

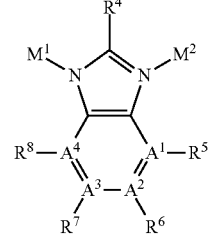

(V)

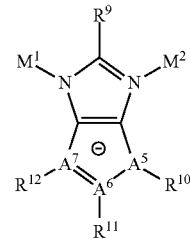

(VI)

wherein $A^1$, $A^2$, $A^3$ and $A^4$ are selected from a group of elements consisting of C, N, P, and B, wherein $A^5$, $A^6$, and $A^7$ can be either C or N, wherein $R^5$-$R^8$ are present when $A^1$ to $A^4$ comprise C, wherein $R^1$, $R^4$ or $R^9$ comprise a non-sterically hindering group that does not interfere with the adjacent $M^1$ or $M^2$, wherein $R^2$, $R^3$, $R^5$, $R^6$, $R^7$, and $R^8$ are each individually hydrogen, alkyl, halo, cyano, or nitro, wherein $M^1$ and $M^2$ comprise the same or different metal cation, and wherein $R^{10}$, $R^{11}$, and $R^{12}$ are each individually electron withdrawing groups (e.g., wherein the first zeolitic imidazolate framework composition comprises the structure of formula IV, and the second zeolitic imidazolate framework composition comprises the structure of formula V).

Embodiment 5

A method according to embodiment 4, wherein both the first and second zeolitic imidazolate framework compositions are porous crystalline materials having a tetrahedral framework comprising a structure selected from the group consisting of VII, VIII, IX, X, XI, XII, XIII, XIV, XV, XVI, XVII, and/or XVIII:

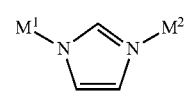

(VII)

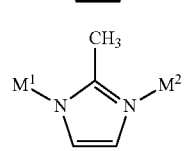

(VIII)

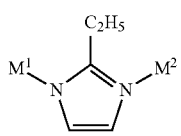
(IX)

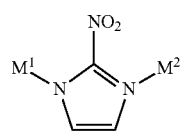
(X)

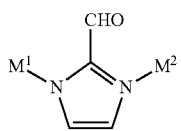
(XI)

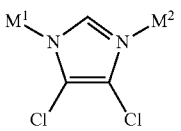
(XII)

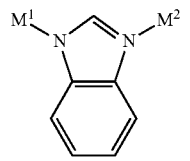
(XIII)

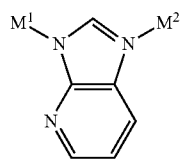
(XIV)

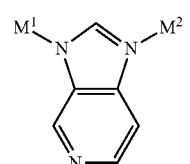
(XV)

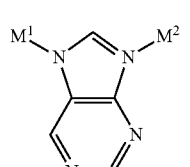
(XVI)

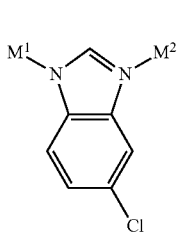
(XVII)

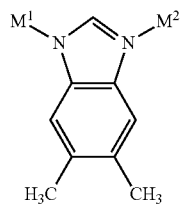
(XVIII)

Embodiment 6

A method according to embodiment 5, (i) wherein the first zeolitic imidazolate framework composition comprises the structure of formulae VII, VIII, IX, X, XI, and/or XII, and the second zeolitic imidazolate framework composition comprises the structure of formulae XIII, XIV, XV, XVI, XVII, and/or XVIII; (ii) wherein the first zeolitic imidazolate framework composition comprises the structure of formula VIII, and the second zeolitic imidazolate framework composition comprises the structure of formulae XIII, XIV, XV, and/or XVI; and/or (iii) wherein the second zeolitic imidazolate framework composition comprises the structure of formula XV.

Embodiment 7

A method according to any one of the previous embodiments, wherein $IM^b$ comprises a functionality lacking in $IM^a$, wherein said functionality has an affinity for adsorbing a gas (e.g., wherein said functionality comprises or is a Lewis base functionality and wherein said gas comprises or is a Lewis acid or a molecule with an electrophilic center; wherein said functionality is a Lewis base functionality in a benzamidazolate and wherein said gas comprises or is $CO_2$; or wherein said functionality comprises or is a Lewis acid functionality, and wherein said gas comprises or is a Lewis base).

Embodiment 8

A method according to any one of the previous embodiments, (i) wherein the first zeolitic imidazolate framework composition is ZIF-8 comprising a 2-methylimidazolate linker, wherein the second organic linker composition is benzimidazolate, wherein the second zeolitic imidazolate framework composition is ZIF-7 comprising a benzimidazolate linker; or (ii) wherein the first zeolitic imidazolate framework composition is ZIF-8 comprising a 2-methylimidazolate linker, wherein the second organic linker composition is 5-azabenzimidazolate, wherein the second zeolitic imidazolate framework composition comprises a 5-azabenzimidazolate linker, and wherein both the first and second zeolitic imidazolate framework compositions have an SOD framework type.

Embodiment 9

A zeolitic imidazolate framework composition with an SOD framework type, wherein the zeolitic imidazolate framework structure is capable of adsorbing, at a temperature of ~28° C.: (i) at least 0.30 mmol of $CO_2$ per gram of zeolitic imidazolate framework composition (e.g., at least 0.35 mmol/g, at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, or at least 1.0 mmol/g) at a $CO_2$ partial pressure of ~75 Torr: (ii) at least 0.35 mmol of $CO_2$ per gram of zeolitic imidazolate framework composition (e.g., at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, or at least 1.3 mmol/g) at a $CO_2$ partial pressure of ~100 Torr; and/or (iii) at least 0.50 mmol of $CO_2$ per gram of zeolitic imidazolate framework composition (e.g., at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, at least 1.3 mmol/g, at least 1.4 mmol/g, at least 1.5 mmol/g, at least 1.6 mmol/g, at least 1.7 mmol/g, or at least 1.8 mmol/g) at a $CO_2$ partial pressure of ~200 Torr.

Embodiment 10

A zeolitic imidazolate framework composition having an empirical formula, Zn(5-azabenzimidazolate)$_2$, wherein the zeolitic imidazolate framework structure is capable of sorbing, at a temperature of ~28° C.: (i) at least 0.30 mmol of $CO_2$ per gram of zeolitic imidazolate framework composition (e.g., at least 0.35 mmol/g, at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, or at least 1.0 mmol/g) at a $CO_2$ partial pressure of ~75 Torr, (ii) at least 0.35 mmol of $CO_2$ per gram of zeolitic imidazolate framework composition (e.g., at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, or at least 1.3 mmol/g) at a $CO_2$ partial pressure of ~100 Torr; and/or (iii) at least 0.50 mmol of $CO_2$ per gram of zeolitic imidazolate framework composition (e.g., at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, at least 1.3 mmol/g, at least 1.4 mmol/g, at least 1.5 mmol/g, at least 1.6 mmol/g, at least 1.7 mmol/g, or at least 1.8 mmol/g) at a $CO_2$ partial pressure of ~200 Torr.

Embodiment 11

A composition of matter having an empirical formula Zn(5-azabenzimidazolate)$_2$ and exhibiting an SOD framework type.

Embodiment 12

A composition of matter according to any one of embodiments 9-11, further comprising at least 0.30 mmol of sorbed $CO_2$ per gram of zeolitic imidazolate framework composition (e.g., at least 0.35 mmol/g, at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, at least 1.3 mmol/g, at least 1.4 mmol/g, at least 1.5 mmol/g, at least 1.6 mmol/g, at least 1.7 mmol/g, at least 1.8 mmol/g, at least 1.9 mmol/g, at least 2.0 mmol/g, at least 2.1 mmol/g, at least 2.2 mmol/g, at least 2.3 mmol/g, at least 2.4 mmol/g, or at least 2.5 mmol/g).

Embodiment 13

A method of adsorbing a gas comprising contacting the porous crystalline material of any one of embodiments 9-12 with a gas (e.g., comprising hydrogen, nitrogen, oxygen, a noble gas, carbon monoxide, carbon dioxide, sulfur dioxide, sulfur trioxide, hydrogen sulfide, ammonia, a hydrocarbon, an amine, or a combination thereof).

Embodiment 14

A method of separating a gas (e.g., comprising hydrogen, nitrogen, oxygen, a noble gas, carbon monoxide, carbon dioxide, sulfur dioxide, sulfur trioxide, hydrogen sulfide, ammonia, a hydrocarbon, an amine, or a combination thereof) from a fluid stream containing the gas comprising contacting the fluid stream with the porous crystalline material of any one of embodiments 9-12.

The invention will now be more particularly described with reference to the Examples and the accompanying drawings.

EXAMPLES

In the Examples, all chemicals used in the synthesis of materials were commercial grade and purchased from Aldrich, except as noted: zinc nitrate tetrahydrate (EM Science, 98.5%), benzimidazole (98%), 4-azabenzimidazole (99%), 5-azabenzimidazole (97%), purine (98%), N,N-dimethylformamide (99.8%), triethylamine (99.5%), acetonitrile (99.5%), chloroform (99.8%), zinc oxide (99.9%). All chemicals were handled in air.

ZIF-8, in the activated form (i.e., with solvent molecules substantially removed), was purchased from Aldrich under the brand name Basolite Z1200. ZIF-7 was synthesized and activated according to the procedure disclosed in U.S. Patent Application Publication No. 2009/0211440. Activated ZIF-8 and ZIF-7 are both believed to be highly hydrophobic solids, and thus were stored under ambient condition and handled in air. ZIF-8 is a material having the empirical formula Zn(2-methyl imidazolate)$_2$ and the framework type SOD. ZIF-7 is a material having the empirical formula Zn(benzimidazolate)$_2$ and the framework type SOD. Although both materials are of the same framework type, they should be relatively easily differentiated by powder X-ray diffraction, due to the different symmetries of the framework.

The reaction vessels used in the Examples were ~23-mL or ~45-mL Parr Acid Digestion Bombs with PTFE liners. For larger quantity reactions, a Parr Pressure Reactor (autoclave) with PTFE liner and Series 4843 temperature controller was used.

The powder X-ray diffraction patterns were measured on a PANalytical X'Pert diffractometer equipped with an X'celerator detector in Bragg-Brentano geometry using Cu Kα radiation (~45 kV and ~40 mA tube voltage and current), a ~¼° fixed divergence slit, and a ~0.017° step size for the two-theta range from ~3 to ~50 degrees. All data processing was conducted using Materials Data JADE 9 software.

Quantitative $^{13}$C MAS NMR spectra were acquired using a Varian InfinityPlus-0.500 wide bore spectrometer operating at a static magnetic field of ~11.74 T, corresponding to a Larmor frequency of about 125 MHz and about 500 MHz for $^{13}$C and $^1$H, respectively. The spectra were recorded using ~4 microsecond 90-degree pulse, ~60-120 second pulse repetition delay on samples loaded in ~5-mm (o.d.) rotors, spinning at a magic angle rate of about 9.5 kHz, and $^1$H decoupling during data acquisition. Chemical shifts shown are relative to tetramethylsilane (TMS, $\delta_C$≈0 ppm). Activated ZIF samples were used for the measurements and a typical sample size was about 75-105 mg, although samples as small as about 10 mg can easily be tested.

The gas sorption measurements were conducted on a Quantachrome Autosorb-1™ automatic gas sorption analyzer. The instrument measures pressure differences due to sorption (in this case physical adsorption and desorption) at the gas/solid interface. At a specified temperature, and using the non-ideality correction factor of the gas at that temperature, the instrument utilizes a proprietary algorithm from basic gas laws to calculate the volume of gas adsorbed onto, and desorbed from, the solid adsorbent for each pressure selected by the user. Volume of gas is converted into millimoles (mmol) and scaled to the weight of adsorbent, resulting in the common units of adsorption (i.e. mmol gas divided by grams of adsorbent, or mmol/g). A plot of amount adsorbed versus pressure, at constant temperature, can represent the sorption isotherm of a particular gas/solid interface. All isotherms were measured at ~28° C. for a single-component gas adsorbate for pressures up to about 760 Torr. Before each isotherm measurement, a sample of about 50-100 mg of an activated ZIF material was outgassed on the pre-treatment station of the Autosorb-1™ under relatively high vacuum (less than 10 mTorr) at about 65-70° C. for about 10-18 hours.

Example 1

Exchange of ZIF-8 (Zn(2-methylimidazolate)$_2$) to form ZIF-7 (Zn(benzimidazolate)$_2$)

About 240 mg of ZIF-8, ~415 mg benzimidazole, and ~5 mL DMF were thoroughly mixed in an NMR sample tube. The sample tube was then subjected to five heating cycles as described below. In a first cycle, the sample tube was placed in an oil bath at a first temperature ($T_1$) of ~26° C. (i.e., approximately room temperature). After a short period of time sufficient to achieve a sample temperature of ~26° C., the sample was inserted into an NMR probe and was maintained at the same temperature of ~26° C. In subsequent cycles, the oil bath was maintained at higher temperatures, and the sample was heated in the oil bath for longer time periods, e.g., ranging from 18 to 21 hours, as specified below. In each cycle, the NMR sample tube was inserted into an NMR probe sitting at a pre-set temperature, which was the same as that of the oil bath, e.g., ($T_1$) for the first cycle. $^1$H NMR and $^{13}$C NMR at spinrate≈0 Hz were recorded in each cycle. The transfer time from the oil bath to the NMR probe at the same temperature was kept to less than 10 minutes in each cycle. After recording the NMR spectra, the next cycle was initiated by ejecting the sample tube from NMR probe and moving the sample tube to oil bath at a higher temperature, e.g., ($T_2$) for the second cycle. The transfer time from the NMR probe to the oil bath was less than 4 minutes in each cycle. In the first cycle, the temperature ($T_1$) of the oil bath and the NMR probe was ~26° C. In the second cycle, the temperature ($T_2$) of the oil bath and the NMR probe was ~40° C., and the sample tube was heated in the oil bath for about 18 hours. In the third cycle, the temperature ($T_3$) of the oil bath and the NMR probe was ~60° C., and the sample tube was heated in the oil bath for about 19 hours. In the fourth cycle, the temperature ($T_4$) of the oil bath and the NMR probe was ~80° C., and the sample tube was heated in the oil bath for about 21 hours. In the fifth cycle, the temperature ($T_5$) of the oil bath and the NMR probe was ~100° C., and the sample tube was heated in the oil bath for about 19 hours.

Figure 2:
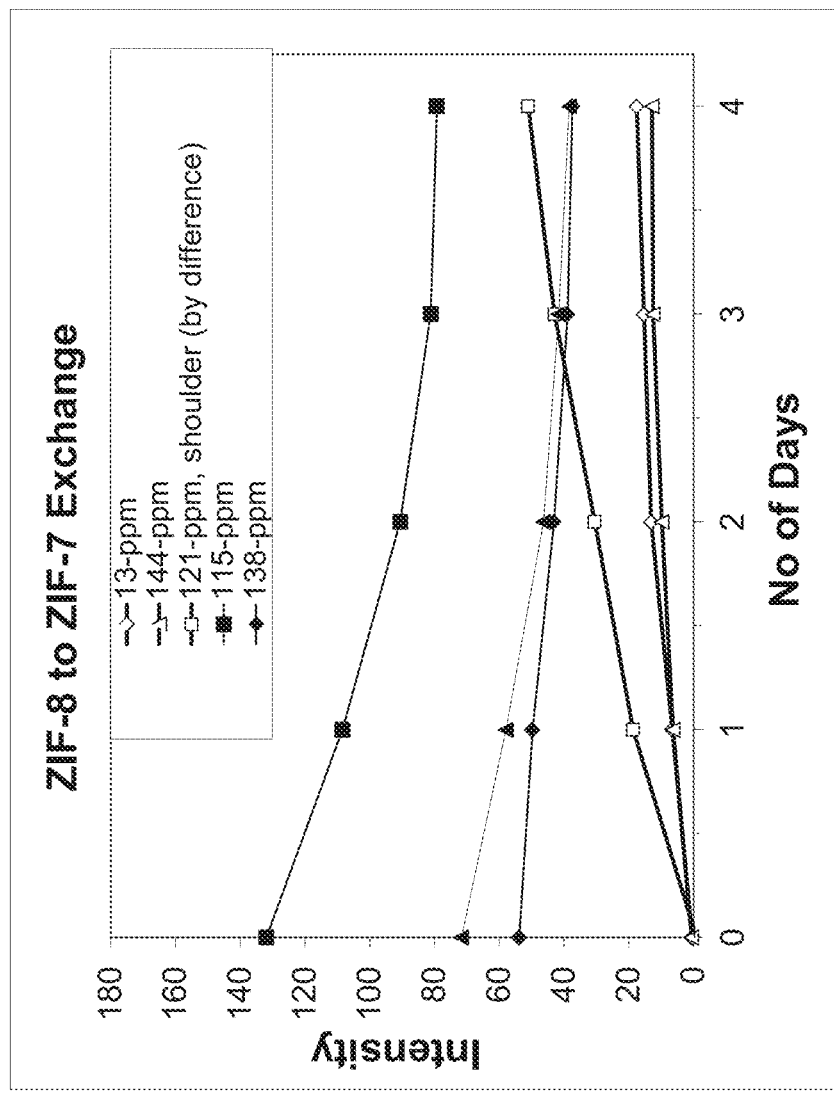
FIG. 2 shows relative intensity changes as a function of time for relevant portions of the spectra shown in FIG. 1.

The 125-MHz liquid-state $^{13}$C NMR spectra are shown in FIG. 1, and results obtained from the spectra are shown in FIG. 2. In FIG. 1, the bottom line represents the spectra for the first cycle at ~26° C., the line second from the bottom represents the spectra for the second cycle at ~40° C., the middle line represents the spectra for the third cycle at ~60° C., the line second from the top line represents the spectra for the fourth cycle at ~80° C. and the top line represents the spectra for the fifth cycle at ~100° C. Certain relevant sections of the spectra are highlighted by shaded regions in FIG. 1.

In this Example, the intensity was observed to change as a function of time for relevant portions of the spectra, as shown. In FIG. 2, intensity changes were shown relative to the ~30 ppm peak arbitrarily set at 1000 counts. In FIG. 2, day zero represented the spectra for cycle 1, day 1 represented the spectra for cycle 2, day 2 represented the spectra for cycle 3, day 3 represented the spectra for cycle 4, and day 4 represented the spectra for cycle 5. The effective exchange of imidazolate linkers, as observed through the disappearance of benzimidazole from, and the appearance of 2-methyl imidazole in, the DMF solvent, can be conveniently seen by the signals at ~115 ppm and ~138 ppm (characteristic of benzimidazole), and at ~13 ppm, ~121-122 ppm, and ~141 ppm (characteristic of 2-methyl imidazole), respectively.

Figure 3:
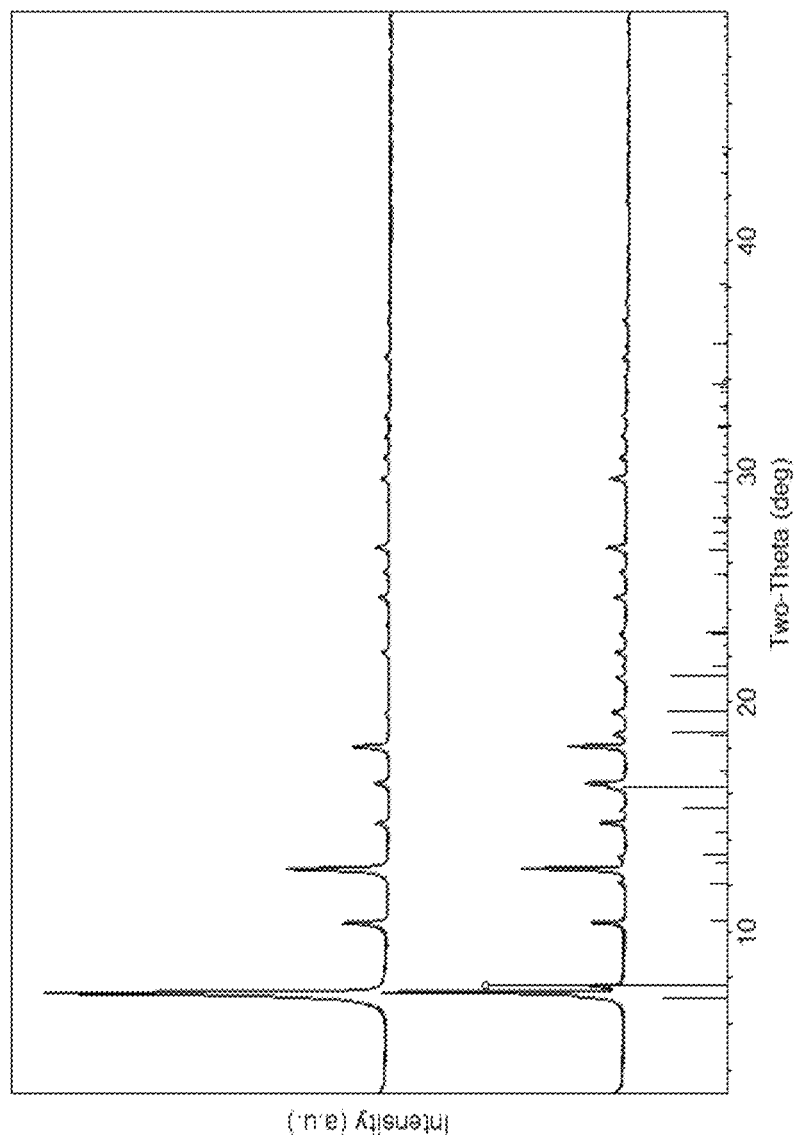
FIG. 3 is an overlay of the X-ray diffraction patterns of the ZIF-8 starting material (top), the solid product recovered in Example 1 (middle), and the calculated stick pattern for ZIF-7 (bottom) based on single-crystal data (*Proc. Nat. Acad. Sci., U.S.A.*, 2006 (103), 10186-10191, Yaghi et al.).

After cycle 5, the solid product was recovered by thoroughly washing with fresh DMF (~5 mL×3). As indicated by the powder X-ray diffraction patterns shown in FIG. 3, the product was identified as comprising ZIF-7, which has the empirical formula Zn(benzimidazolate)$_2$ and the framework type SOD, along with some residual unconverted ZIF-8 (which also has the SOD framework type).

Example 2

Exchange of ZIF-8 (Zn(2-methylimidazolate)$_2$) to form EMM-19 (Zn(5-azabenzimidazolate)$_2$)

A clear solution of ~1.00 g 5-azabenzimidazole in ~10 mL DMF was prepared in a glass vial, and then added to ~100 mg of solid ZIF-8, which was previously weighed out in a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF. The product was designated herein as EMM-19.

Figure 4:
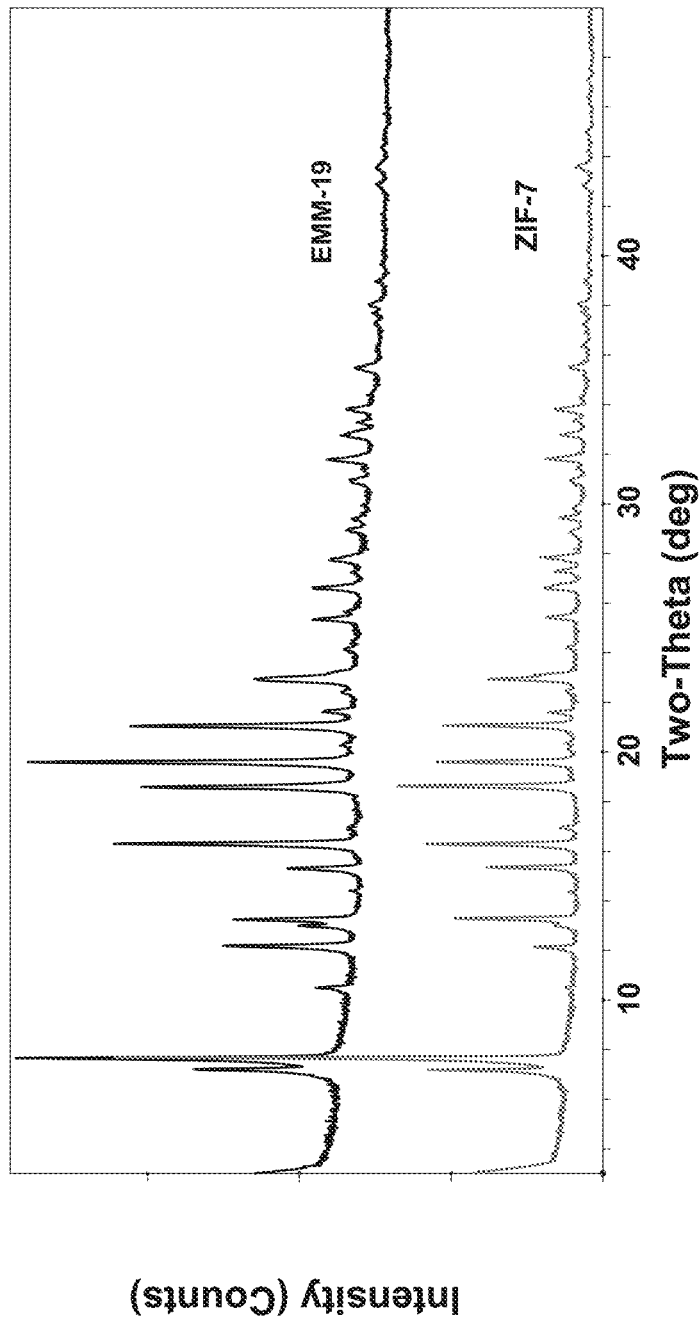
FIG. 4 is an overlay of the X-ray diffraction patterns of the as-synthesized EMM-19 product from Example 2 (top) and as-synthesized ZIF-7 (bottom).

FIG. 4 compares the powder X-ray diffraction patterns of EMM-19 and ZIF-7, both in the as-synthesized form. The excellent agreement of the patterns supports the conclusion that these two materials have the same framework type (SOD). EMM-19, which has the empirical formula Zn(5-azabenzimidazolate)$_2$ and the framework type SOD, is believed to be a new composition of matter. As reflected in the literature, when 5-azabenzimidazolate is used to form a ZIF by a conventional solvothermal crystallization technique, the resulting ZIF has been known to exhibit only the framework type LTA.

The as-synthesized EMM-19 was activated by using the same method as that for as-synthesized ZIF-7, which was disclosed in U.S. Patent Application Publication No. 2009/

0211440. Specifically, (1) a sample of about 100 mg of the as-synthesized EMM-19 was immersed in about 15 mL acetonitrile (3 times in ~3 days) at ambient temperature (about 20-25° C.) to achieve a partial exchange of the DMF solvent molecules occluded in the pores; (2) the solvent was decanted and the sample was dried under vacuum at ~200° C. for ~3 hours; (3) the dried sample was soaked in ~10 mL acetonitrile at ~75° C. for ~24 hours and then rinsed with fresh acetonitrile; and (4) the acetonitrile-exchanged sample was placed under vacuum (less than about 10 mTorr) at ~70° C. for about 10 hours to yield activated EMM-19.

The activated EMM-19 was stored under ambient conditions and used for further experiments described below, including solid-state NMR (Example 3), gas adsorption/desorption (Example 5), and seeded synthesis (Example 14).

Example 3

Solid-State $^{13}$C MAS NMR of ZIF-7 and EMM-19

Figure 5:
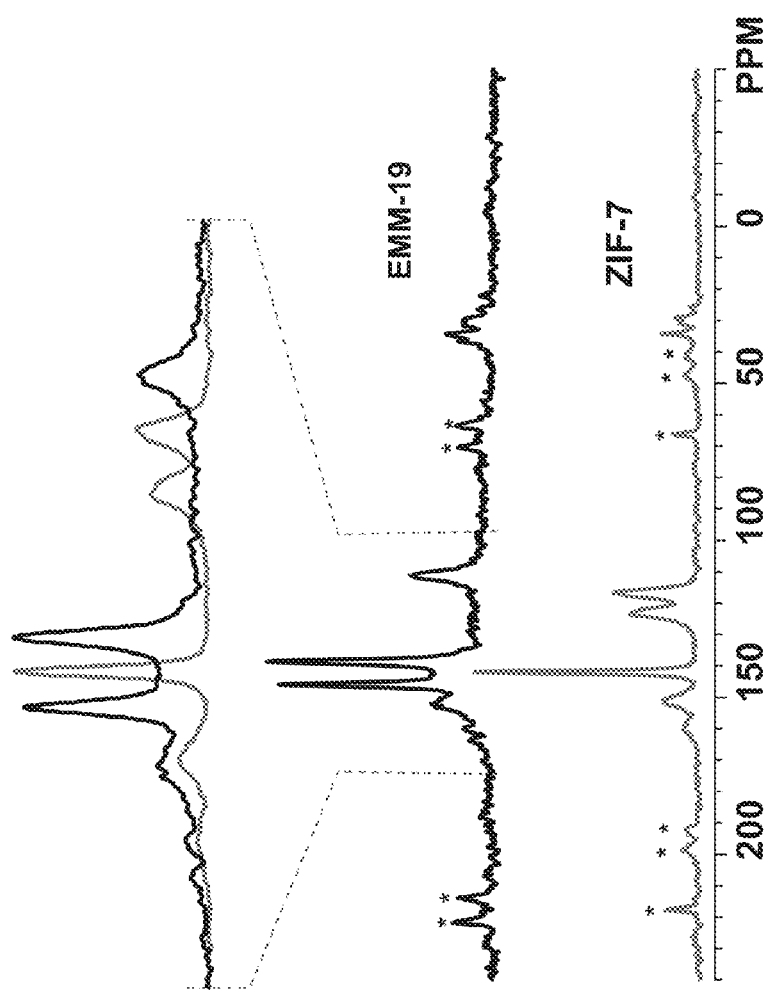
FIG. 5 shows solid-state magic-angle spinning 125 MHz $^{13}$C NMR peaks for activated ZIF-7 and activated EMM-19, as measured in Example 3.

FIG. 5 provides a comparison of the activated EMM-19 product of Example 2 and activated ZIF-7, as measured by 125-MHz $^{13}$C magic-angle spinning (MAS) NMR. In FIG. 5, the spectrum for ZIF-7 is shown on the bottom, the spectrum for EMM-19 is shown in the middle, and zoomed superimposed spectra are shown on the top. Asterisks in FIG. 5 are believed to primarily indicate spinning sidebands.

FIG. 5 shows distinct peaks corresponding to 5-azabenzimidazolate and benzimidazolate linkers, respectively, which are believed to support the conclusion that the organic linker content of EMM-19 was indeed substantially 5-azabenzimidazolate, thereby indicating an empirical formula of Zn(5-azabenzimidazolate)$_2$ for EMM-19.

Example 4

Preparation and Activation of ZIF-22

Figure 6:
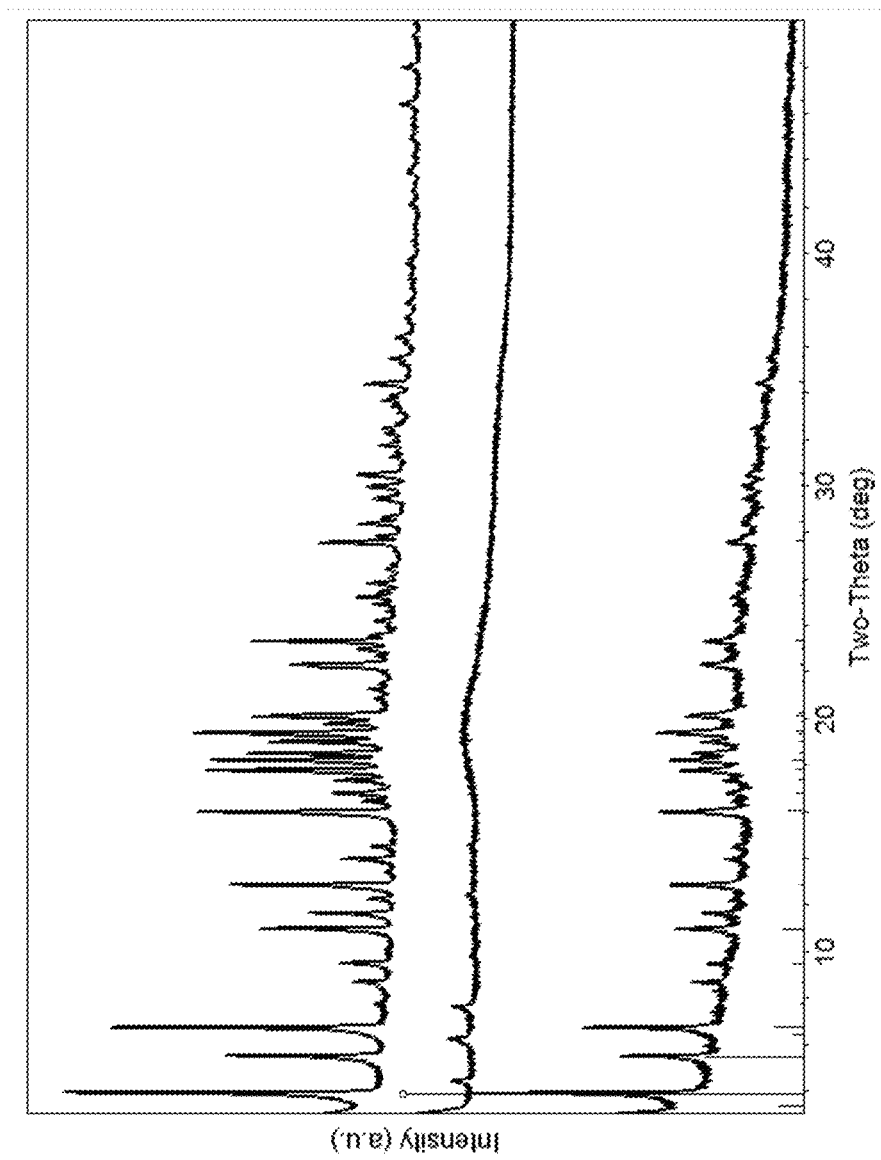
FIG. 6 is an overlay of the X-ray diffraction patterns of the as-synthesized ZIF-22 (top), acetonitrile-exchanged ZIF-22 (middle), and activated ZIF-22 (bottom) prepared in Example 4, and the calculated stick pattern for ZIF-22 based on single-crystal data (*Nat. Mater.*, 2007 (6), 501-596. Yaghi et al.).

To a solution of ~232 mg Zn(NO$_3$)$_2$.4H$_2$O and ~2 g 5-azabenzimidazole in ~20 mL DMF in a glass vial was added ~244 μL triethylamine by using a micro-pipette. After the resulting mixture was substantially homogenized by sonication, it was transferred to a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3), stored in DMF, and labelled "as-synthesized ZIF-22". The purity of the product was confirmed by the excellent agreement of the powder X-ray diffraction pattern of as-synthesized ZIF-22 and the calculated pattern based on the crystal structure of ZIF-22 determined by single-crystal X-ray crystallography (FIG. 6).

An attempt to exchange the DMF solvent molecules occluded in as-synthesized ZIF-22 with acetonitrile, by using the procedure established for EMM-19 and ZIF-7 (Example 2), proved unsuccessful. This was evidenced by the compromised powder X-ray diffraction pattern of acetonitrile-exchanged ZIF-22 (FIG. 6).

Instead, the as-synthesized ZIF-22 was activated according to a procedure disclosed in the article "Insight into the crystal synthesis, activation and application of ZIF-20", *RSC Advances*, Vol. 1, 2011, pp. 917-22 by Seoane et al. (ZIF-20 is the purine counterpart of ZIF-22). Specifically, (1) a sample of about 110 mg as-synthesized ZIF-22 was dried on a vacuum line (ultimate vacuum of about 20 mTorr) at ~70° C. for about 6 hours to remove the DMF at the external surface of the sample and possibly the loosely occluded DMF inside the pores; (2) the dried sample was transferred to a glass vial, thoroughly washed with chloroform (~15 mL×3), and then continuously stirred in ~15 mL chloroform by using a magnetic stirrer at ambient temperature (about 25° C.) for about 30 hours; (3) the chloroform-exchanged sample was evacuated on a vacuum line (ultimate vacuum of about 20 mTorr) at ~70° C. for about 10 hours to yield "activated ZIF-22". The activated ZIF-22 sample prepared through chloroform-exchange had retained the original crystalline framework structure (FIG. 5).

Example 5

Comparison of Adsorption/Desorption Properties of EMM-19, ZIF-7, and ZIF-22

CO$_2$ and N$_2$ adsorption/desorption isotherms were measured at ~28° C. for the activated EMM-19 of Example 2, the activated ZIF-22 of Example 4, and an activated ZIF-7, with two separate CO$_2$ isotherm experiments, starting at two different pressure points, being conducted for the EMM-19 sample.

Figure 7:
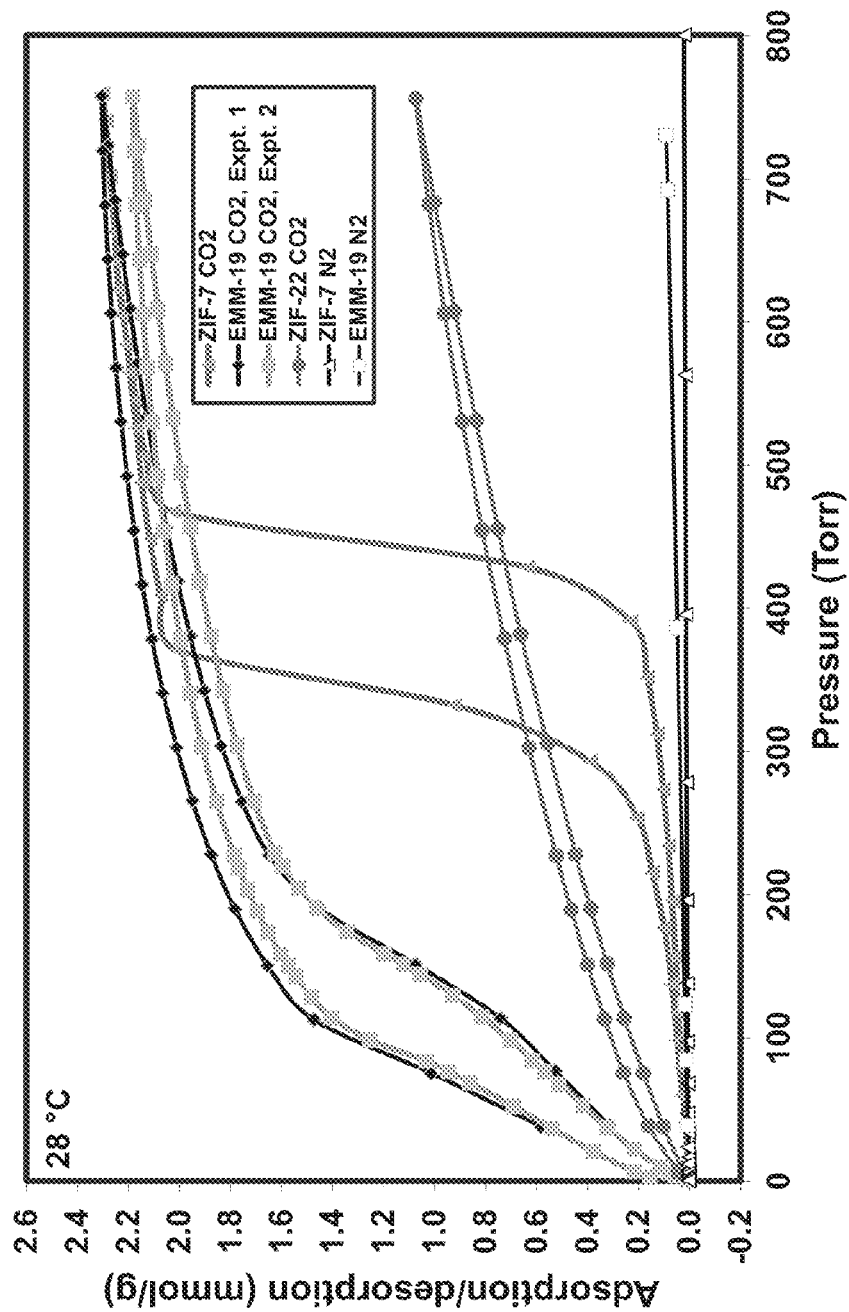
FIG. 7 shows $CO_2$ adsorption/desorption isotherms for ZIF-7, ZTF-22, and two different experiments for EMM-19, as well as $N_2$ adsorption/desorption isotherms for ZIF-7 and EMM-19.

FIG. 7 compares the CO$_2$ isotherms for EMM-19, ZIF-7, and ZIF-22, and the N$_2$ isotherms for EMM-19 and ZIF-7, with solid symbols being used for the adsorption branches and open symbols for the desorption branches. FIG. 7 seems to show that EMM-19 sorbed more CO$_2$ at a lower CO$_2$ partial pressures, compared to that observed for ZIF-7. In addition, FIG. 7 seems to show that the isotherm of ZIF-22 did not exhibit step-shaped hysteresis and that ZIF-22 exhibited far lower adsorption capacities at ~760 Torr (~1.1 mmol/g) and ~76 Torr (~0.18 mmol/g) CO$_2$ partial pressures, as compared to the EMM-19 samples, over the measured pressure range.

FIG. 7 also seems to show, based on the CO$_2$ isotherms of EMM-19 and ZIF-7, that both materials exhibited a step-shaped hysteresis and exhibited a CO$_2$ adsorption capacity of about 2.0-2.2 mmol/g at about 760 Torr (i.e., in the near-plateau region after the step on the adsorption branch), but differed significantly in the onset point of the step, with the uptake threshold CO$_2$ partial pressure having shifted to a much lower pressure for EMM-19 (about 400 Torr for ZIF-7, less than about 50 Torr for EMM-19). Consequently, EMM-19 appeared to adsorb more CO$_2$ than ZIF-7 in the relatively low CO$_2$ partial pressure region.

Without being bound by theory, the enhanced CO$_2$ adsorption at lower partial pressures observed for EMM-19 was believed to indicate the suitability of the material for separating CO$_2$ from lower-pressure gas streams, for example, carbon capture for flue gas streams, in which a major challenge can be to separate CO$_2$ (minor component) from N$_2$ (major component).

Even though process schemes can be designed to operate at low ratios of adsorption loading (in mmol/g) for the minor component (in this case, CO$_2$) vs. the adsorption loading (in mmol/g) for the major component (in this case, N$_2$), it can be preferred in some embodiments for an adsorptive loading ratio for CO$_2$ over N$_2$ for the ZIF material be at least 5, e.g., at least 10, at least 15, at least 20, at least 25, at least 30, at least 35, at least 40, at least 45, or at least 50. Since the required equipment size, cost, and operating expenses can tend to be significantly lowered at higher adsorptive loading ratios, the separations processes can become much more attractive by utilizing materials and conditions that lead to higher adsorptive loading ratios. The adsorptive loading ratio is a property for a specific adsorbate-adsorbent pair, at given conditions of pressure and temperature ("standard" conditions of pressure and temperature can be measured at either operating partial pressures for the specific components and operating temperature conditions for the feedstream contacting the ZIF-containing adsorbent, or alternately at single component testing conditions, such as about 301 K (about 28° C.) and about 106.6 kPaa (about 800 Torr)). Other details of adsorptive loading ratios of $CO_2$ over $N_2$ for ZIF materials, and their context in commercial separations processes, can be found, e.g., in U.S. Patent Application Publication No. 2009/0214407.

Examples 6-11

Other Linker Exchange Reactions in DMF

A series of further linker exchange reactions using DMF as the solvent for different ZIF starting materials (in this case, ZIF-8 and ZIF-7) and different imidazole starting materials (in this case, 5-azabenzimidazole, 4-azabenzimidazole, and purine) were conducted as Examples 6-11. The results are summarized in Table 1 below.

Example 6

Exchange of ZIF-8 with 4-Azabenzimidazole

A clear solution of ~500 mg 4-azabenzimidazole in ~5 mL DMF was prepared in a glass vial, and then added to ~50 mg of solid ZIF-8, which was previously weighed out in a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 8:
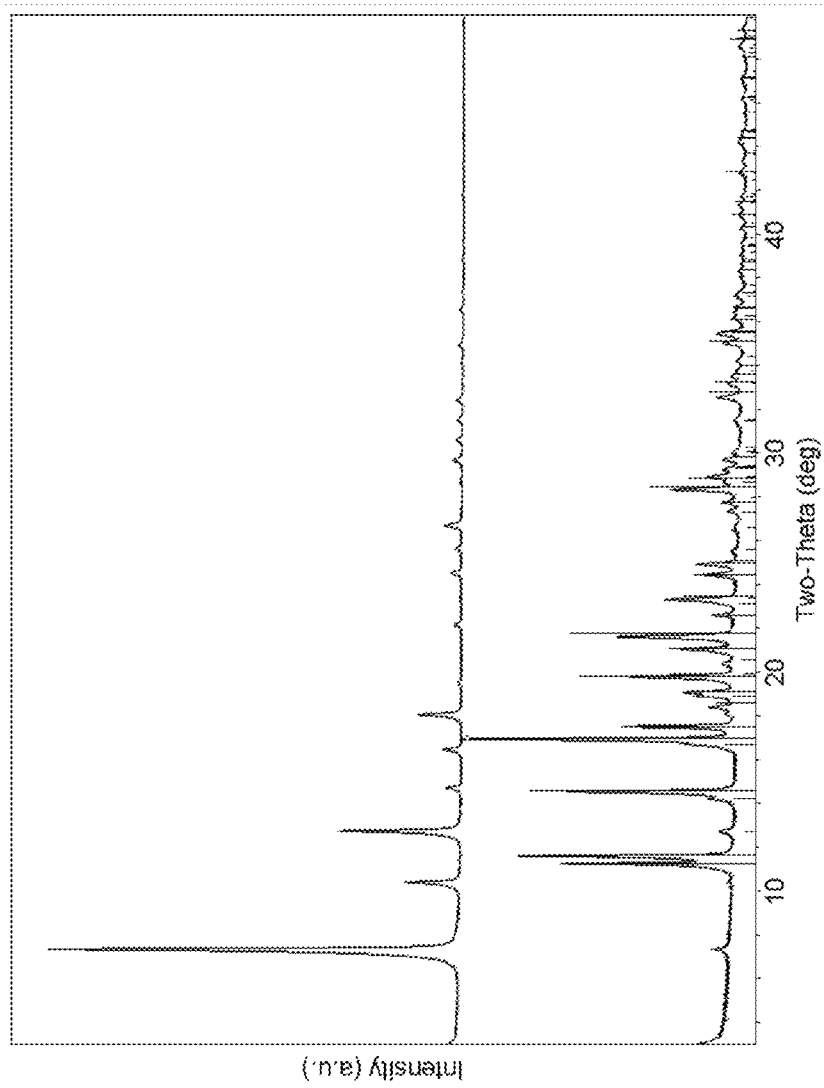
FIG. 8 is an overlay of the X-ray diffraction patterns of the ZIF-8 starting material (top), the product of Example 6 (middle), and the calculated stick pattern for ZIF-23 (bottom) based on single-crystal data (*Nat. Mater.*, 2007 (6), 501-596, Yaghi et al.).

As indicated by the powder X-ray diffraction patterns shown in FIG. 8, the product appeared to comprise a mixture of ZIF-23 (DIA) with a small amount of unreacted ZIF-8 (SOD).

Example 7

Exchange of ZIF-8 with 5-Azabenzimidazole

A clear solution of ~200 mg 5-azabenzimidazole in ~15 mL DMF was prepared in a glass vial, and then added to ~50 mg of solid ZIF-8, which was previously weighed out in a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 9:
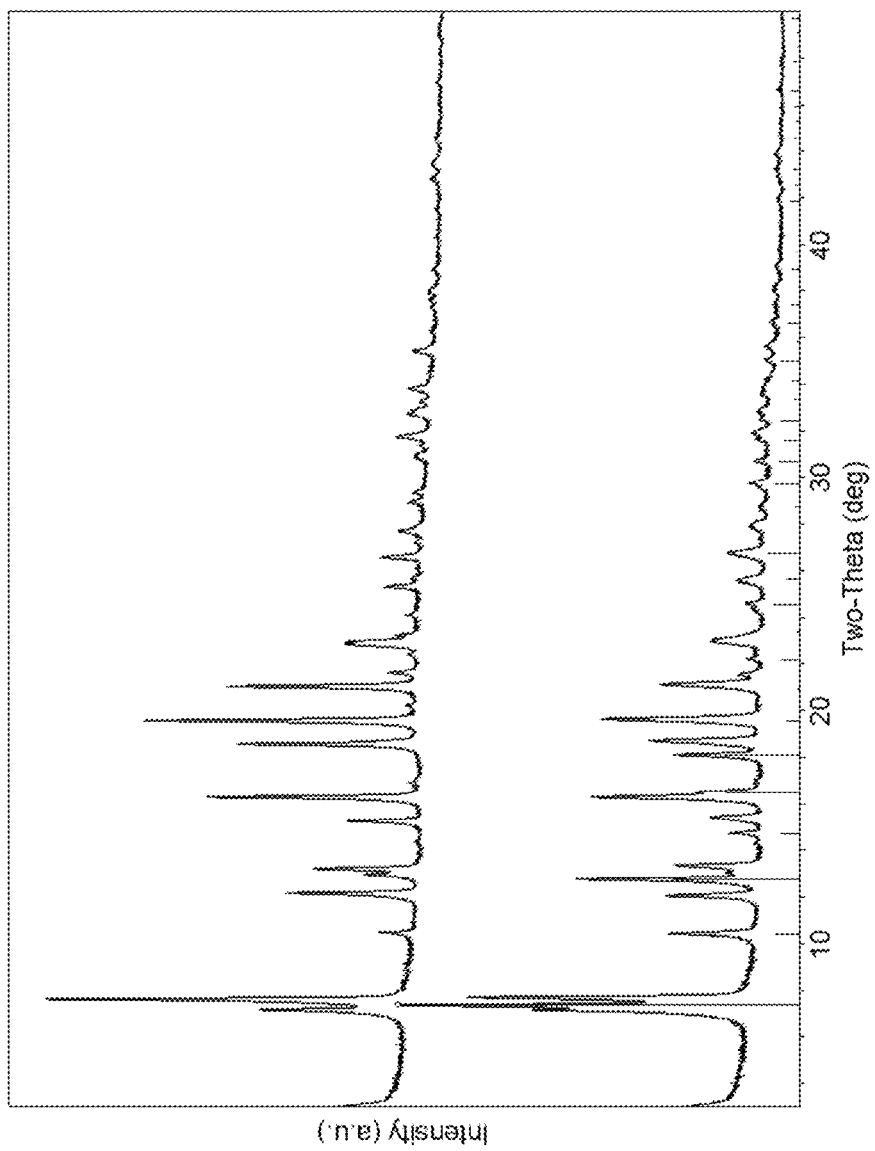
FIG. 9 is an overlay of the X-ray diffraction patterns of the as-synthesized EMM-19 of Example 2 (top), the product of Example 7 (middle), and the calculated stick pattern for ZIF-8 (bottom) based on single-crystal data (*Proc. Nat. Acad. Sci., U.S.A.,* 2006 (103), 10186-10191, Yaghi et al.).

As indicated by the powder X-ray diffraction patterns shown in FIG. 9, the product appeared to comprise a mixture of EMM-19 (SOD) and unreacted ZIF-8 (SOD).

Example 8

Exchange of ZIF-8 with 4-Azabenzimidazole

A clear solution of ~200 mg 4-azabenzimidazole in ~15 mL DMF was prepared in a glass vial, and then added to ~50 mg of solid ZIF-8, which was previously weighed out in a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 10:
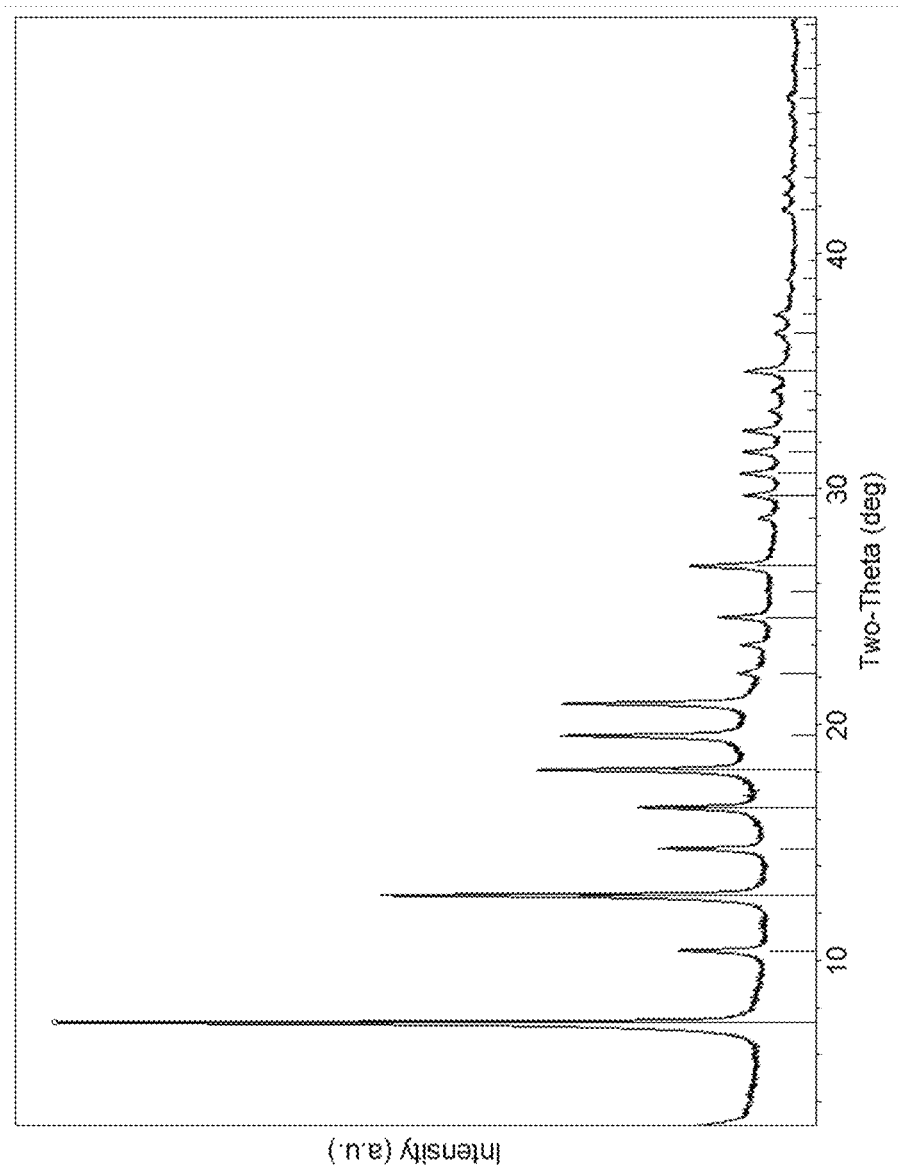
FIG. 10 is an overlay of the X-ray diffraction patterns of the product of Example 8 (top) and the calculated stick pattern for ZIF-8 (bottom) based on single-crystal data (*Proc. Nat. Acad. Sci., U.S.A.,* 2006 (103), 10186-10191, Yaghi et al.).

As indicated by the powder X-ray diffraction patterns shown in FIG. 10, the product appeared to be unreacted ZIF-8 (SOD).

Example 9

Exchange of ZIF-8 with Purine

A clear solution of ~200 mg purine in ~15 mL DMF was prepared in a glass vial, and then added to ~50 mg of solid ZIF-8, which was previously weighed out in a PTFE cup of a ~23-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 11:
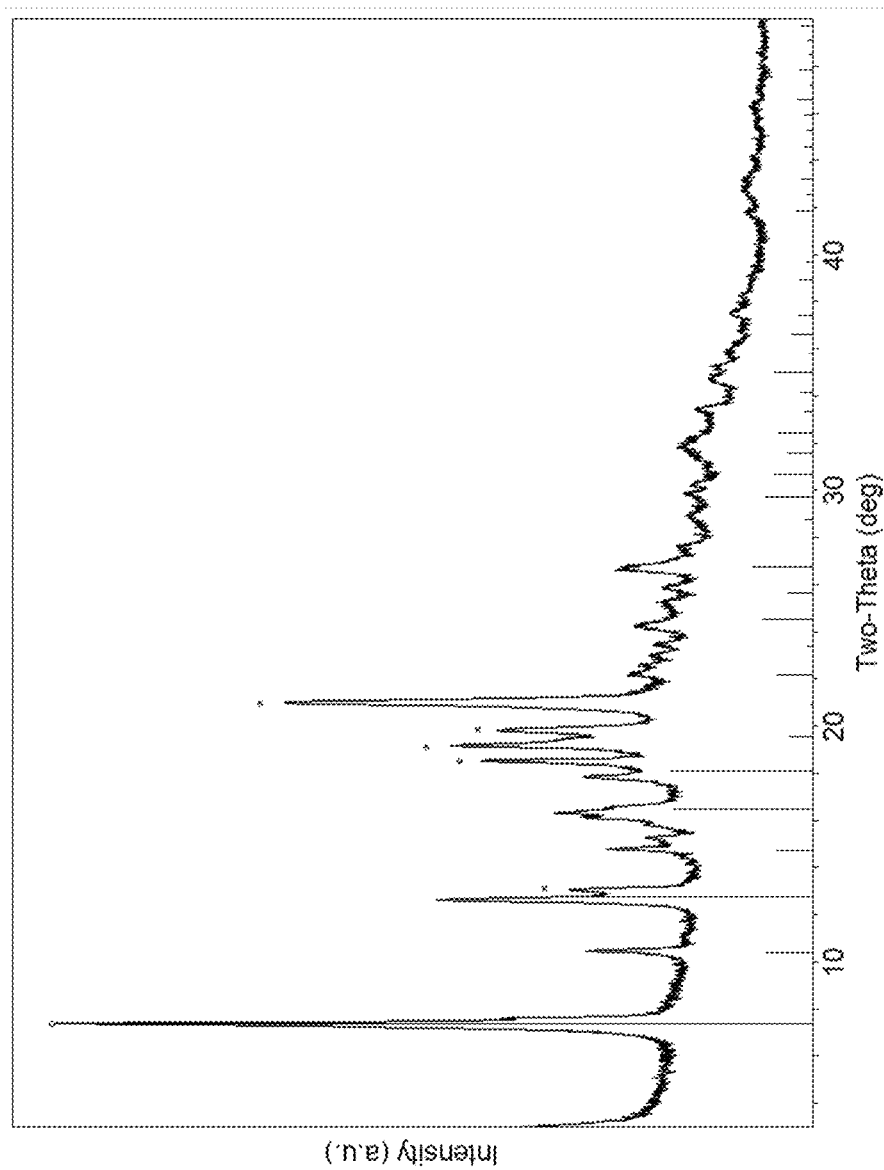
FIG. 11 is an overlay of the X-ray diffraction patterns of the product of Example 9 (top) and the calculated stick pattern for ZIF-8 (bottom) based on single-crystal data (*Proc. Nat. Acad. Sci.,* U.S.A., 2006 (103), 10186-10191, Yaghi et al.).

As indicated by the powder X-ray diffraction patterns shown in FIG. 11, the product appeared to comprise a mixture of unreacted ZIF-8 (SOD) with an unidentified crystalline phase. The diffraction peaks corresponding to the unidentified phase (with asterisk marks) all appeared at two-theta angles greater than about 13°, which can typically indicate a small unit cell, and thus are likely believed to indicate the presence of a dense/non-porous phase.

Example 10

Exchange of ZIF-7 with 5-Azabenzimidazole

A clear solution of ~1 g 5-azabenzimidazole in ~10 mL DMF was prepared in a glass vial, and then added to ~100 mg of solid activated ZIF-7, which was previously weighed out in a PTFE cup of a ~45-mL Parr bomb. The Parr bomb was then sealed and heated in an isothermal oven at ~140° C. for about 72 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 12:
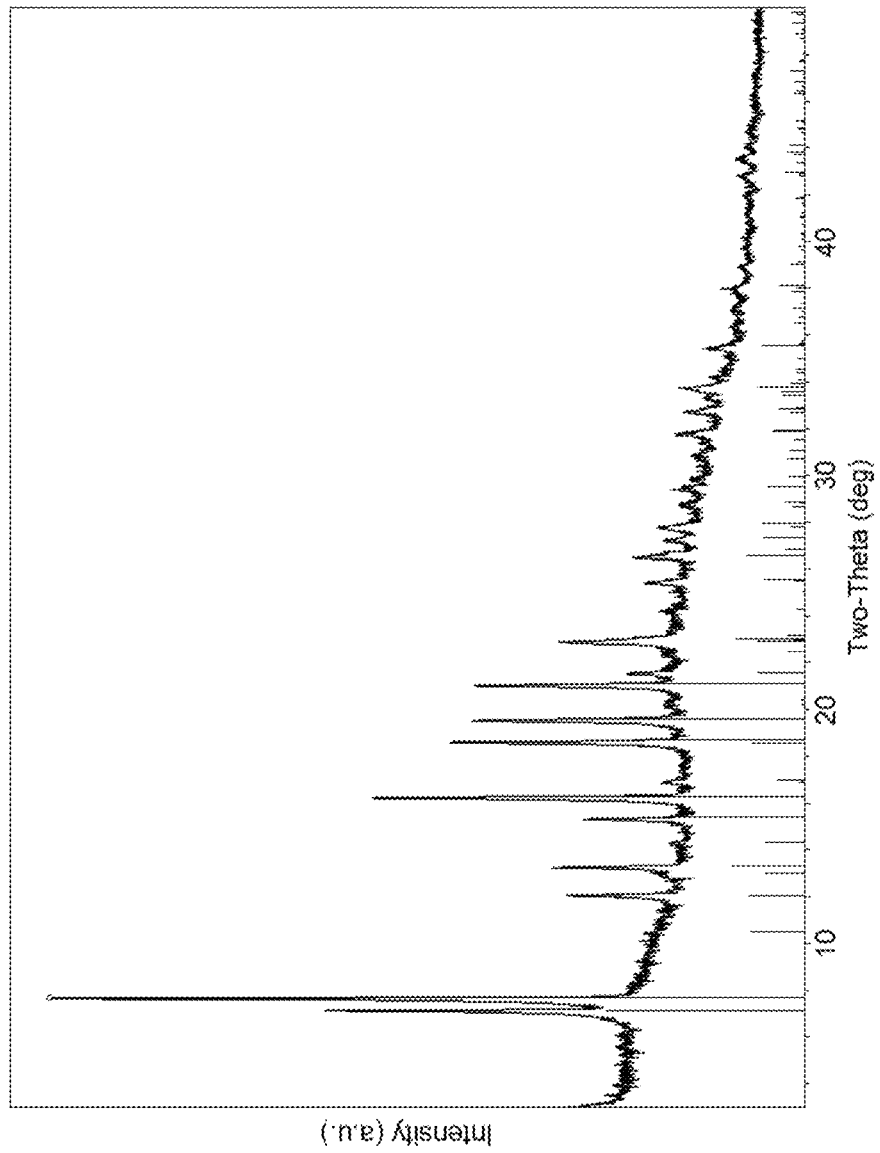
FIG. 12 is an overlay of the X-ray diffraction patterns of the product of Example 10 (top) and the calculated stick pattern for ZIF-7 (bottom) based on single-crystal data (*Proc. Nat. Acad. Sci.,* U.S.A., 2006 (103), 10186-10191, Yaghi et al.).
Figure 13:
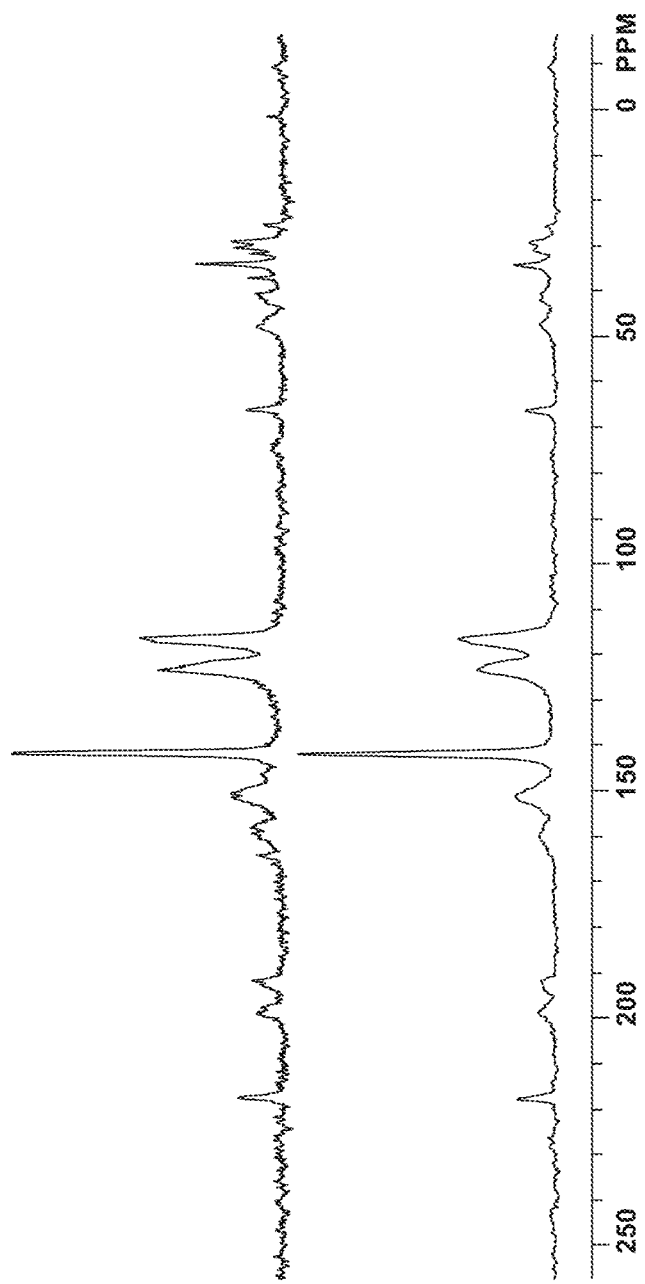
FIG. 13 is an overlay of the solid-state $^{13}$C NMR spectra of the activated product of Example 10 (top) and activated ZIF-7 (bottom).

As shown in FIG. 12, the powder X-ray diffraction pattern of the as-synthesized product appeared identical to that of ZIF-7 (SOD). As shown in FIG. 13, the solid-state $^{13}C$ NMR data of the activated product appeared to confirm that the product was unreacted ZIF-7.

Example 11

Exchange of ZIF-7 with Purine

A clear solution of ~646 mg purine in ~6.5 mL DMF was prepared in a glass vial, and then added to ~65 mg of solid activated ZIF-7, which was previously weighed out in a PTFE cup of a ~45-mL Parr bomb. The Parr bomb was then sealed and heated in an isothermal oven at ~140° C. for about 72 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 14:
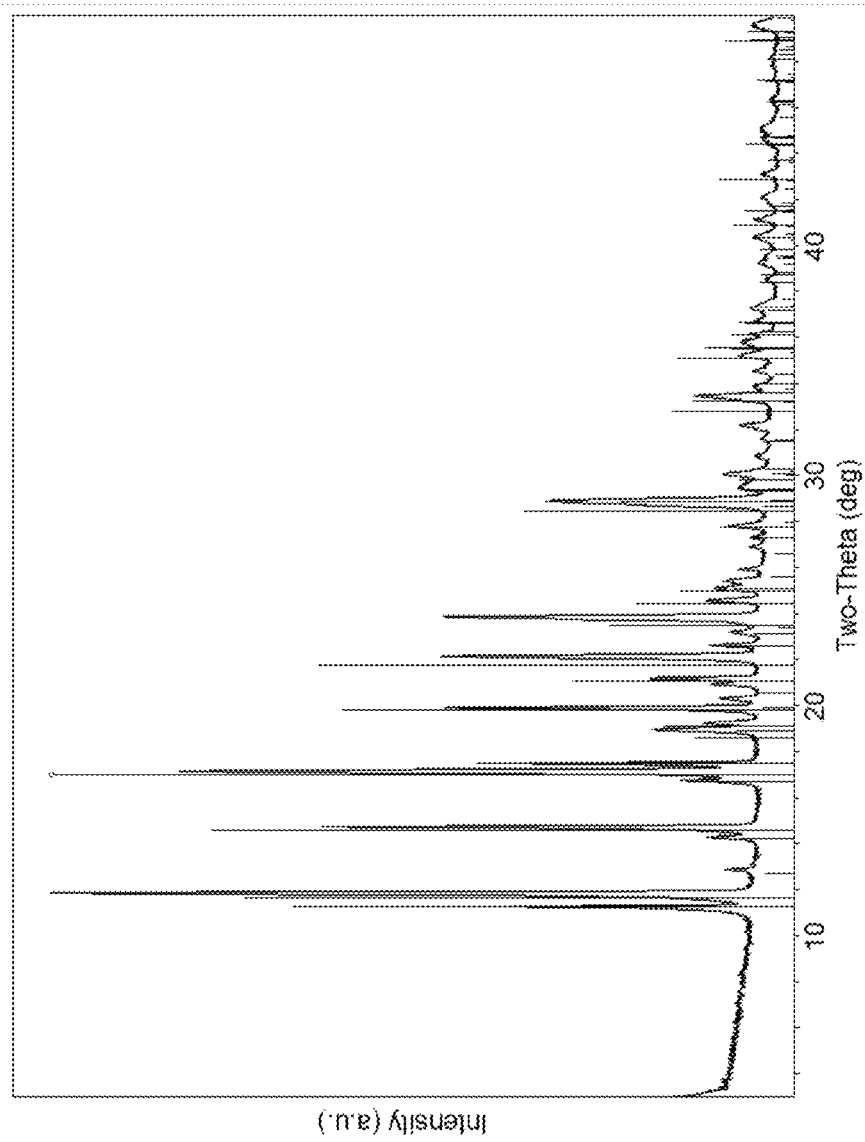
FIG. 14 is an overlay of the X-ray diffraction patterns of the product of Example 11 (top) and the calculated stick pattern for ZIF-23 (bottom) based on single-crystal data (*Nat. Mater.,* 2007 (6), 501-596, Yaghi et al.).

As shown in FIG. 14, the powder X-ray diffraction pattern of the product closely resembled that of ZIF-23 (DIA).

Figure 15:
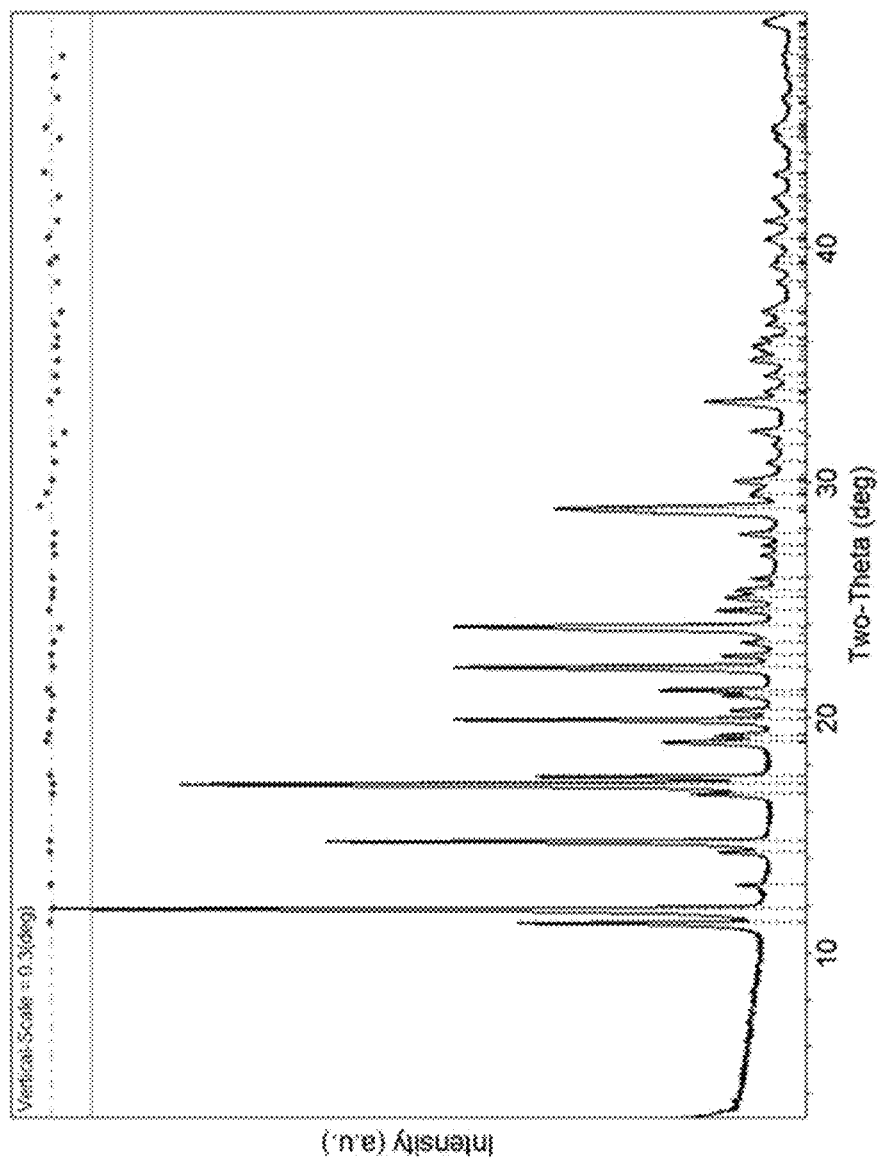
FIG. 15 shows the results of indexing the X-ray diffraction pattern of the product of Example 11 using Materials Data JADE 9 software.

As shown in FIG. 15, the powder X-ray diffraction pattern of the product was indexed by using Materials Data JADE 9 software to an orthorhombic unit cell, space group $P2_12_12_1$, a≈9.358 Å, b≈10.154 Å, c≈12.434 Å, α≈β≈γ≈90°, which was very close to that of ZIF-23 (orthorhombic, $P2_12_12_1$, a=9.5477 Å, b≈10.1461 Å, c≈12.4459 Å, α≈β≈γ≈90°) reported in the Supplementary Information for "Zeolite A Imidazolate Frameworks", *Nature Materials*, Vol. 6, 2007, pp. 501-6 by Yaghi and co-workers. Without being bound by theory, it is believed that the product comprised the purine counterpart of ZIF-23, i.e., a $Zn(purinate)_2$ of the framework type DIA.

TABLE 1

| Example No. | 2 | 6 | 7 | 8 | 9 | 10 | 11 |
|---|---|---|---|---|---|---|---|
| Starting ZIF | ZIF-8 | ZIF-8 | ZIF-8 | ZIF-8 | ZIF-8 | ZIF-7 | ZIF-7 |
| Starting Linker[1] | 5-Aza | 4-Aza | 5-Aza | 4-Aza | Purine | 5-Aza | Purine |
| Linker/Zn (mol/mol) | 19 | 19 | 7.6 | 7.6 | 7.6 | 25 | 25 |
| Linker Conc. (mol/L) | 0.84 | 0.84 | 0.11 | 0.11 | 0.11 | 0.84 | 0.84 |
| Temperature (° C.) | 140 | 140 | 140 | 140 | 140 | 140 | 140 |
| Time (hour) | 24 | 24 | 24 | 24 | 24 | 72 | 72 |

[1]5-Aza = 5-azabenzimidazole; 4-Aza = 4-azabenzimidazole

Example 12

Linker Exchange Reactions for ZIF-8 in Acetonitrile

A series of three separate exchange reactions for ZIF-8 using acetonitrile as the solvent for different imidazole starting materials (in this case, 5-azabenzimidazole, 4-azabenzimidazole, and purine) were conducted as described below. The results are summarized in Table 2 below.

A solid mixture of ~50 mg ZIF-8 and ~200 mg 5-azabenzimidazole was placed in a ~20-mL glass vial. About 15 mL acetonitrile was added into the vial, and the mixture was homogenized by sonication. The vial was then capped and labeled as Reaction 1. The procedure described above was repeated twice, using respectively 4-azabenzimidazole (Reaction 2) and purine (Reaction 3), instead of 5-azabenzimidazole.

These three capped vials were placed in a ~300-mL autoclave. A small amount of acetonitrile was added into the autoclave to balance the acetonitrile vapor pressure inside the vials. The autoclave was then sealed and heated at ~140° C. for ~48 hours (~2° C./min ramp rate). After the autoclave had cooled naturally to ambient temperature (about 25° C.), the three reaction vials were retrieved from it. For each vial, the mother liquor was decanted, and the solid product was washed thoroughly with acetonitrile (~5 mL×3) and stored in acetonitrile.

Figure 16:
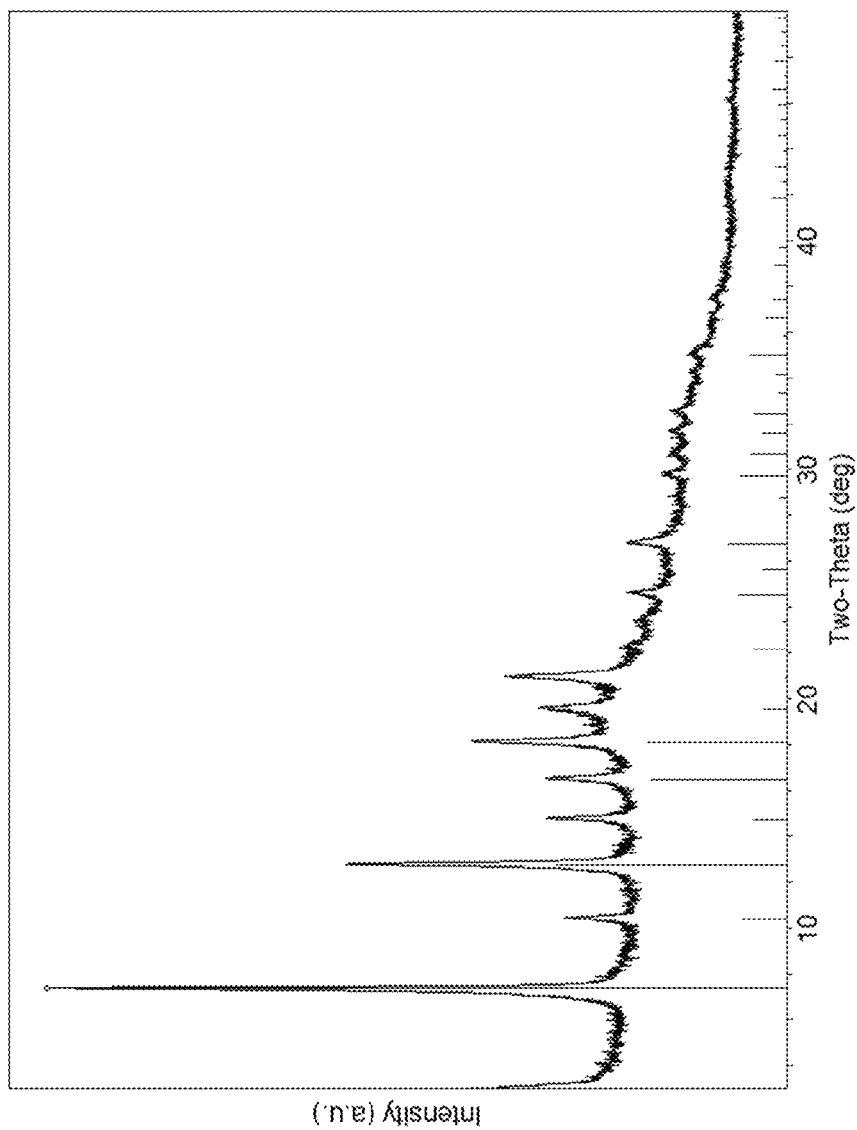
FIG. 16 is an overlay of the X-ray diffraction patterns of the product of Reaction 1 of Example 12 (top) and the calculated stick pattern for ZIF-8 (bottom) based on single-crystal data (*Proc. Nat. Acad. Sci.,* U.S.A., 2006 (103), 10186-10191, Yaghi et al.).

As indicated by the powder X-ray diffraction patterns shown in FIG. 16, the product of Reaction 1 was believed to comprise unreacted ZIF-8 (SOD).

Figure 17:
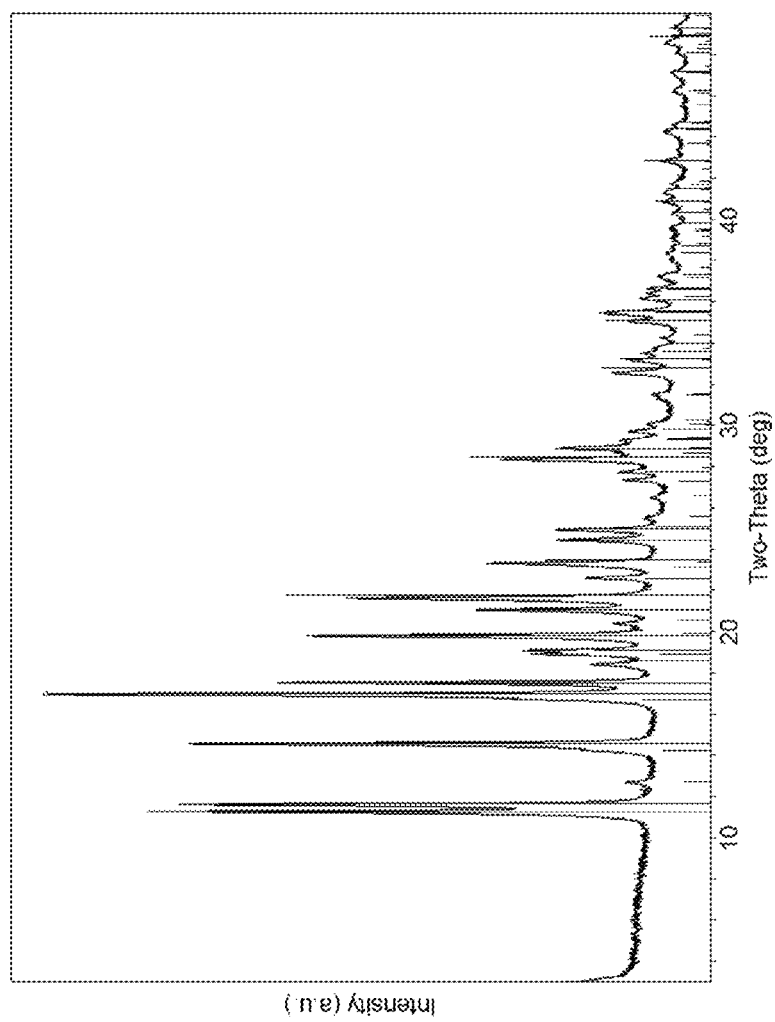
FIG. 17 is an overlay of the X-ray diffraction patterns of the product of Reaction 2 of Example 12 (top) and the calculated stick pattern for ZIF-23 (bottom) based on single-crystal data (*Nat. Mater.,* 2007 (6), 501-596, Yaghi et al.).

As indicated by the powder X-ray diffraction patterns shown in FIG. 17, the product of Reaction 2 was believed to comprise ZIF-23 (DIA).

Figure 18:
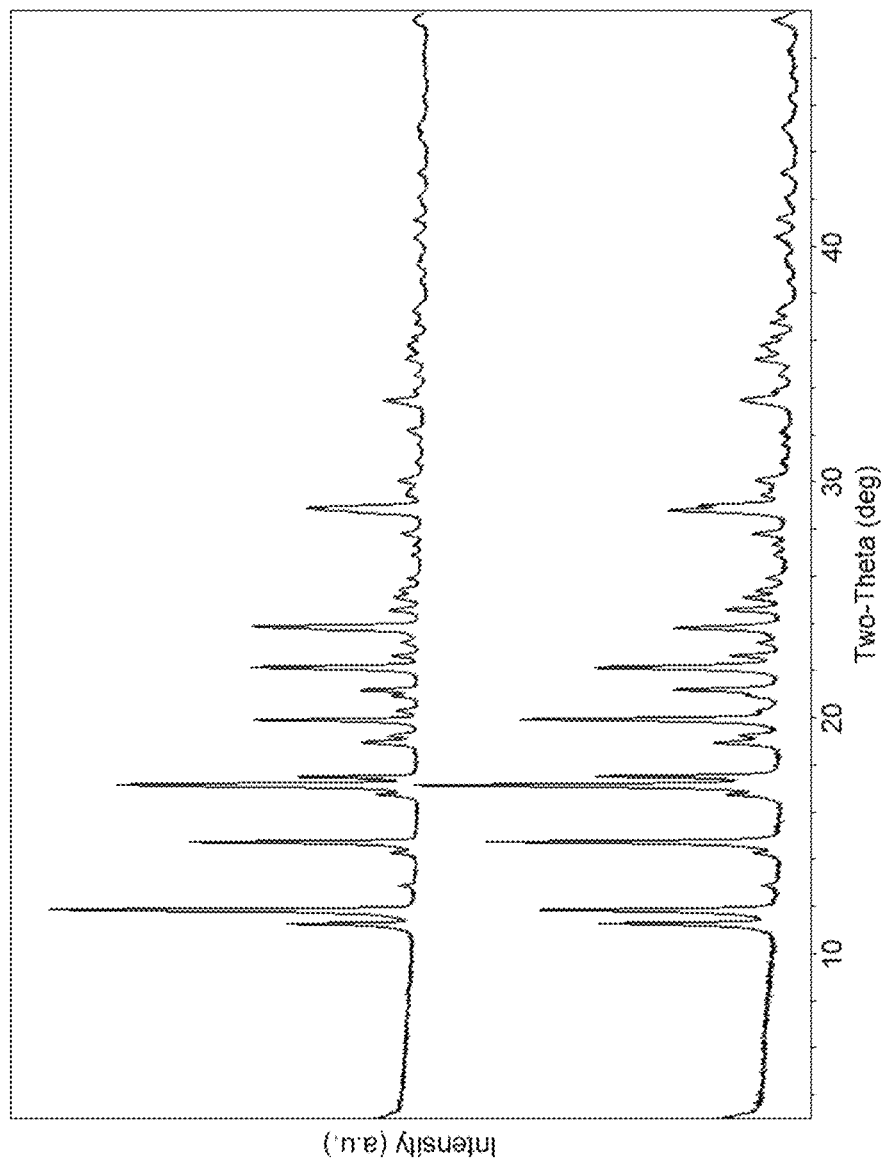
FIG. 18 is an overlay of the X-ray diffraction patterns of the product of Example 11 (top) and the product of Reaction 3 of Example 12 (bottom).

As indicated by the powder X-ray diffraction patterns shown in FIG. 18, the product of Reaction 3 appeared to be the same as that of Example 11, i.e., a $Zn(purinate)_2$ of the framework type DIA.

TABLE 2

| | Reaction No. | | |
|---|---|---|---|
| | 1 | 2 | 3 |
| Starting ZIF | ZIF-8 | ZIF-8 | ZIF-8 |
| Starting Linker[1] | 5-Aza | 4-Aza | Purine |
| Linker/Zn (mol/mol) | 7.6 | 7.6 | 7.6 |
| Temperature (° C.) | 140 | 140 | 140 |
| Time (hour) | 48 | 48 | 48 |

[1]5-Aza = 5-azabenzimidazole; 4-Aza = 4-azabenzimidazole

Example 13

Solvothermal Synthesis in DMF Using ZnO as the Zinc Source

A clear solution of ~500 mg 5-azabenzimidazole in ~5 mL DMF was prepared in a glass vial, and then added to ~18 mg of solid ZnO, which was previously weighed out in a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 19:
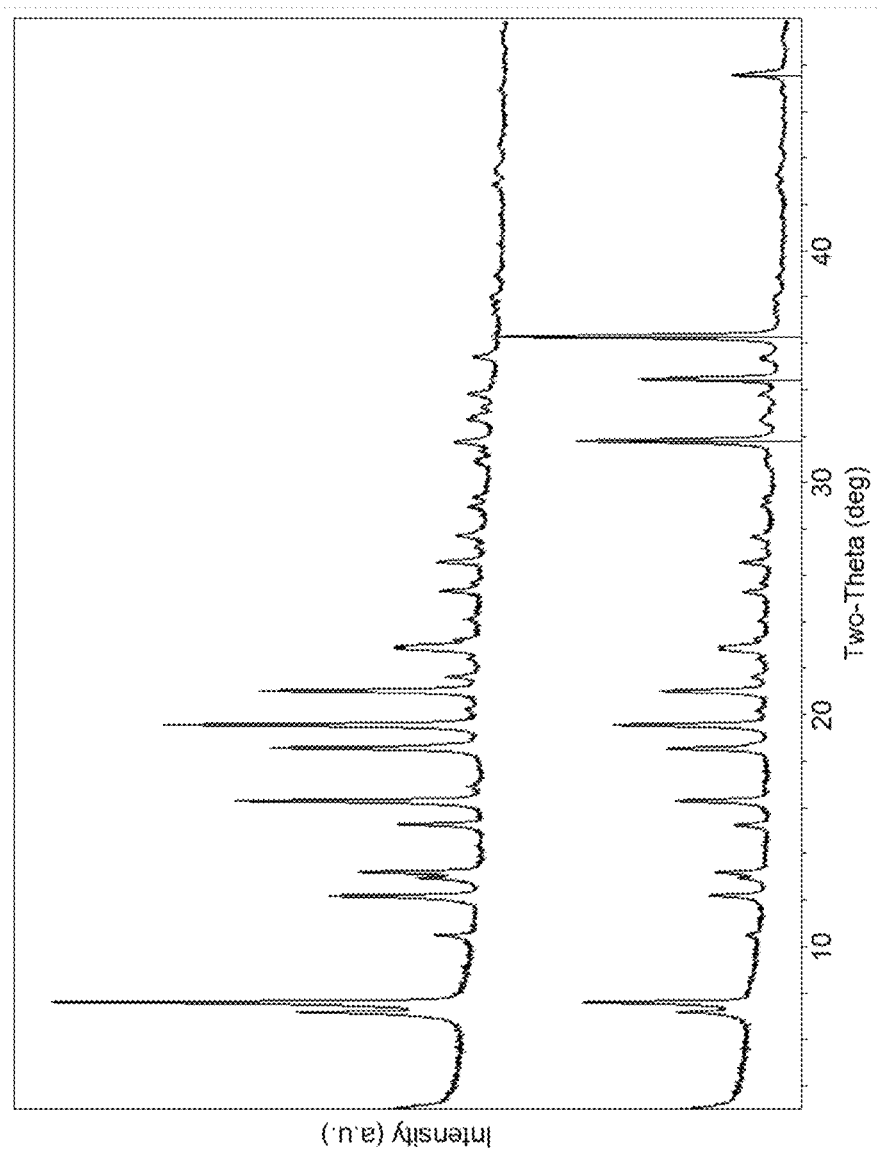
FIG. 19 is an overlay of the X-ray diffraction patterns of the as-synthesized EMM-19 of Example 2 (top), the product of Example 13 (middle), and the calculated stick pattern for zincite, ZnO (bottom).

As indicated by the powder X-ray diffraction patterns shown in FIG. 19, the product appeared to comprise a mixture of EMM-19 (SOD) and unreacted ZnO.

A comparison of the results of Example 13 with those of Example 2 are shown in Table 3 below.

TABLE 3

| | Example 2 | Example 13 |
|---|---|---|
| Zinc Source | ZIF-8 | ZnO |
| Starting Linker[1] | 5-Aza | 5-Aza |
| Linker/Zn (mol/mol) | 19 | 19 |
| Linker Conc. (mol/L) | 0.84 | 0.84 |
| Temperature (° C.) | 140 | 140 |
| Time (hour) | 24 | 24 |

[1]5-Aza = 5-azabenzimidazole

Example 14

Solvothermal Synthesis in DMF Seeded with EMM-19

A solution of ~1 g 5-azabenzimidazole and ~116 mg $Zn(NO_3)_2 \cdot 4H_2O$ in ~10 mL DMF was prepared in a glass vial, and then added to ~5 mg of solid activated EMM-19 (prepared according to Example 2), which was previously weighed out in a PTFE cup of a ~23-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

As indicated by the powder X-ray diffraction patterns shown in FIG. 20, the product appeared to comprise a mixture of ZIF-22 (LTA) and EMM-19 (SOD), which appeared to indicate the relative ineffectiveness of seeding in inhibiting the formation of the commonly observed LTA phase, thus appearing to confirm a lack of fundamental change in the crystallization mechanism of the system.

A comparison of the results of Example 14 with those of Example 2 are shown in Table 4 below.

TABLE 4

|  | Example 2 | Example 14 |
|---|---|---|
| Zinc Source | ZIF-8 | $Zn(NO_3)_2 \cdot 4H_2O$ |
| Starting Linker[1] | 5-Aza | 5-Aza |
| Linker/Zn (mol/mol) | 19 | 19 |
| Linker Conc. (mol/L) | 0.84 | 0.84 |
| Temperature (° C.) | 140 | 140 |
| Time (hour) | 24 | 24 |
| Seed Crystal | None | EMM-19 |

[1]5-Aza = 5-azabenzimidazole

Example 15

Synthesis of ZIF-7 in Solvent Mixture of MeCN and TEA

A mixture of ~4.8 g (~40 mmol) benzimidazole and ~5.33 g (~20 mmol) $Zn(NO_3)_2 \cdot 4H_2O$ in ~240 mL acetonitrile was prepared in a vessel and sonicated for about 20 minutes. Then ~5.66 mL (~40 mmol) of triethylamine (as an example of a Brønsted base) was added and the corresponding mixture then sonicated for an additional ~40 minutes. The solution was then sealed in a Parr acid digestion bomb and heated in an isothermal oven at ~100° C. for about 48 hours. After reaction, the Parr bomb was removed from the oven and allowed to cool naturally to ambient temperature (about 25° C.). Then, the Parr bomb was opened, the mother liquor decanted, and the solid product washed thoroughly with acetonitrile (~90 mL×3) and stored in acetonitrile. Powder x-ray diffraction (not shown) of a dried slurry of the product indicated it was indeed ZIF-7. Further measurements indicated that the product (sample was outgassed for ~3 hours at about 75° C.) also had a BET surface area of ~12.7 $m^2/g$. A $CO_2$ adsorption isotherm was also done on the product (also not shown), yielding relatively similar adsorption, desorption, and hysteresis behavior as a ZIF-7 product synthesized in DMF. These testing results appear to indicate that ZIF-7, or more generally potentially all ZIFs and MOFs (or some subset of ZIFs and MOFs), can be synthesized using solvents (or solvent mixtures) that have a relatively low boiling point and/or a relatively high vapor pressure, e.g., higher than DMF, and perhaps higher than water.

The significance of being able to use relatively low boiling point and/or a relatively high vapor pressure solvents/solvent mixtures as synthesis media is tied to the difficulty of removing detectable traces of higher boiling point and/or lower vapor pressure solvents, even under relatively severe and repeated solvent removal/exchange conditions. For instance, in the case of ZIF-8 made by a conventional synthesis in DMF and stored in DMF, experiments were undertaken to determine the severity of the treatment necessary to remove all traces of DMF from the ZIF-8 sample. $^{13}C$ solid state MAS Bloch decay NMR was used to detect trace amounts of DMF in each sample. A single solvent exchange with acetonitrile (desolvated of DMF at ambient temperature at a reduced pressure of no more than about 20 mTorr, then washed with excess MeCN, and desolvated again at ambient temperature at a reduced pressure of no more than about 20 mTorr) was ineffective at removing DMF—indeed, considerable DMF was still found to be detectable by NMR techniques. DMF was also still detectable upon drying a ZIF-8/DMF sample at a temperature of about 100° C. under a reduced pressure of no more than about 10 mTorr for about 2 hours, and even upon drying a ZIF-8/DMF sample at a temperature of about 250° C. (almost 100° C. higher than its atmospheric boiling point!) under a reduced pressure of no more than about 10 mTorr for about 2 hours. Only when a ZIF-8/DMF sample was dried at a temperature of about 250° C. under a reduced pressure of no more than about 10 mTorr overnight (for about 16 hours) were there no detectable traces of DMF, as measured by $^{13}C$ NMR techniques. As this exemplary case shows, considerable money, effort, time, and resources could be saved if such synthesis reactions were able to be conducted in solvents (or solvent mixtures) having relatively low boiling points and/or relatively high vapor pressures.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for exchanging imidazolate linker in a zeolitic imidazolate framework composition, said method comprising the steps of: (a) providing a first zeolitic imidazolate framework composition having a tetrahedral framework comprising a general structure, $M^1$-$IM^a$-$M^2$, wherein $M^1$ and $M^2$ comprise the same or different metal cations, and wherein $IM^a$ is an imidazolate or a substituted imidazolate linking moiety; (b) providing a liquid composition comprising $IM^b$, wherein $IM^b$ is an imidazolate or a substituted imidazolate which is different from $IM^a$; and (c) contacting the first zeolitic imidazolate framework composition with the liquid composition under conditions sufficient to exchange at least a portion of $IM^a$ with at least a portion of $IM^b$ and to produce a second zeolitic imidazolate framework composition, $M^1$-$IM^c$-$M^2$, wherein $IM^c$ comprises $IM^b$, and wherein the framework type of the second zeolitic imidazolate framework composition is different from the framework type obtained when a zeolitic imidazolate framework composition is prepared by crystallizing a liquid reaction mixture comprising a solution of $M^1$, $M^2$ and $IM^b$.

2. A method according to claim 1, wherein the framework type of the first zeolitic imidazolate framework composition is the same as the framework type of the second zeolitic imidazolate framework composition.

3. A method according to claim 1, wherein the first zeolitic imidazolate framework composition comprises less than 1 mole percent of $IM^b$, based on the total moles of $IM^a$ and $IM^b$ in the first zeolitic imidazolate framework composition, wherein the liquid composition comprises less than 1 mole percent of $IM^a$, based on the total moles of $IM^a$ and $IM^b$ in the liquid composition, and wherein the second zeolitic imidazolate framework composition comprises at least 10 mole percent of $IM^b$, based on the total moles of $IM^a$ and $IM^b$ in the second zeolitic imidazolate framework composition.

4. A method according to claim 1, wherein the first zeolitic imidazolate framework composition comprises less than 1 mole percent of $IM^b$, based on the total moles of $IM^a$ and $IM^b$ in the first zeolitic imidazolate framework composition, wherein the liquid composition comprises less than 1 mole percent of $IM^a$, based on the total moles of $IM^a$ and $IM^b$ in the liquid composition, and wherein the second zeolitic imidazolate framework composition comprises at least 50 mole percent of $IM^b$, based on the total moles of $IM^a$ and $IM^b$ in the second zeolitic imidazolate framework composition.

5. A method according to claim 1, wherein the first zeolitic imidazolate framework composition comprises less than 1 mole percent of $IM^b$, based on the total moles of $IM^a$ and $IM^b$ in the first zeolitic imidazolate framework composition, wherein the liquid composition comprises less than 1 mole percent of $IM^a$, based on the total moles of $IM^a$ and $IM^b$ in the liquid composition, and wherein the second zeolitic imidazolate framework composition comprises at least 90 mole percent of $IM^b$, based on the total moles of $IM^a$ and $IM^b$ in the second zeolitic imidazolate framework composition.

6. A method according to claim 1, wherein both of the first and second zeolitic imidazole framework compositions comprise at least one transition metal.

7. A method according to claim 1, wherein both of the first and second zeolitic imidazolate framework compositions having a framework type selected from the group consisting of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAG, CAN, CAS, CDO, CFI, CGF, CGS, CHA, CHI, CLO, CON, CRB, CZP, DAC, DDR, DFO, DFT, DIA, DOH, DON, EAB, EDI, EMT, EON, EPI, ERI, ESV, ETR, EUO, EZT, FAR, FAU, FER, FRA, FRL, GIS, GIU, GME, GON, GOO, HEU, IFR, IHW, ISV, ITE, ITH, ITW, IWR, IWV, IWW, JBW, KFI, LAU, LCS, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, POZ, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG, ZNI, ZON, and combinations thereof.

8. A method according to claim 5, wherein both of the first and second zeolitic imidazole framework compositions have a framework type selected from the group consisting of CRB, DFT, CAG, SOD, MER, RHO, ANA, LTA, DIA, ZNI, GME, LCS, FRL, GIS, POZ, MOZ, and combinations thereof.

9. A method according to claim 5, wherein said transition metal is selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, Uub, and combinations thereof.

10. A method according to claim 1, wherein both the first and second zeolitic imidazolate framework compositions are porous crystalline materials having a tetrahedral framework comprising a structure selected from the group consisting of IV, V, VI, or any combination thereof:

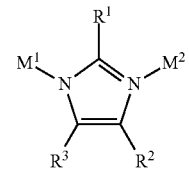

(IV)

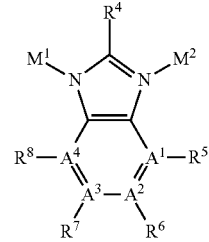

(V)

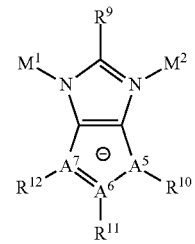

(VI)

wherein $A^1$, $A^2$, $A^3$ and $A^4$ are selected from a group of elements consisting of C, N, P, and B, wherein $A^5$, $A^6$, and $A^7$ can be either C or N, wherein $R^5$-$R^8$ are present when $A^1$ to $A^4$ comprise C, wherein $R^1$, $R^4$ or $R^9$ comprise a non-sterically hindering group that does not interfere with the adjacent $M^1$ or $M^2$, wherein $R^2$, $R^3$, $R^5$, $R^6$, $R^7$, and $R^8$ are each individually hydrogen, alkyl, halo, cyano, or nitro, wherein $M^1$ and $M^2$ comprise the same or different metal cation, and wherein $R^{10}$, $R^{11}$, and $R^{12}$ are each individually electron withdrawing groups.

11. A method according to claim 10, wherein the first zeolitic imidazolate framework composition comprises the structure of formula IV, and the second zeolitic imidazolate framework composition comprises the structure of formula V.

12. A method according to claim 10, wherein both of the first and second zeolitic imidazolate framework compositions are porous crystalline materials having a tetrahedral framework comprising a structure selected from the group consisting of VII, VIII, IX, X, XI, XII, XIII, XIV, XV, XVI, XVII, and/or XVIII:

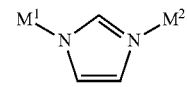

(VII)

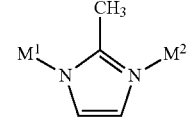

(VIII)

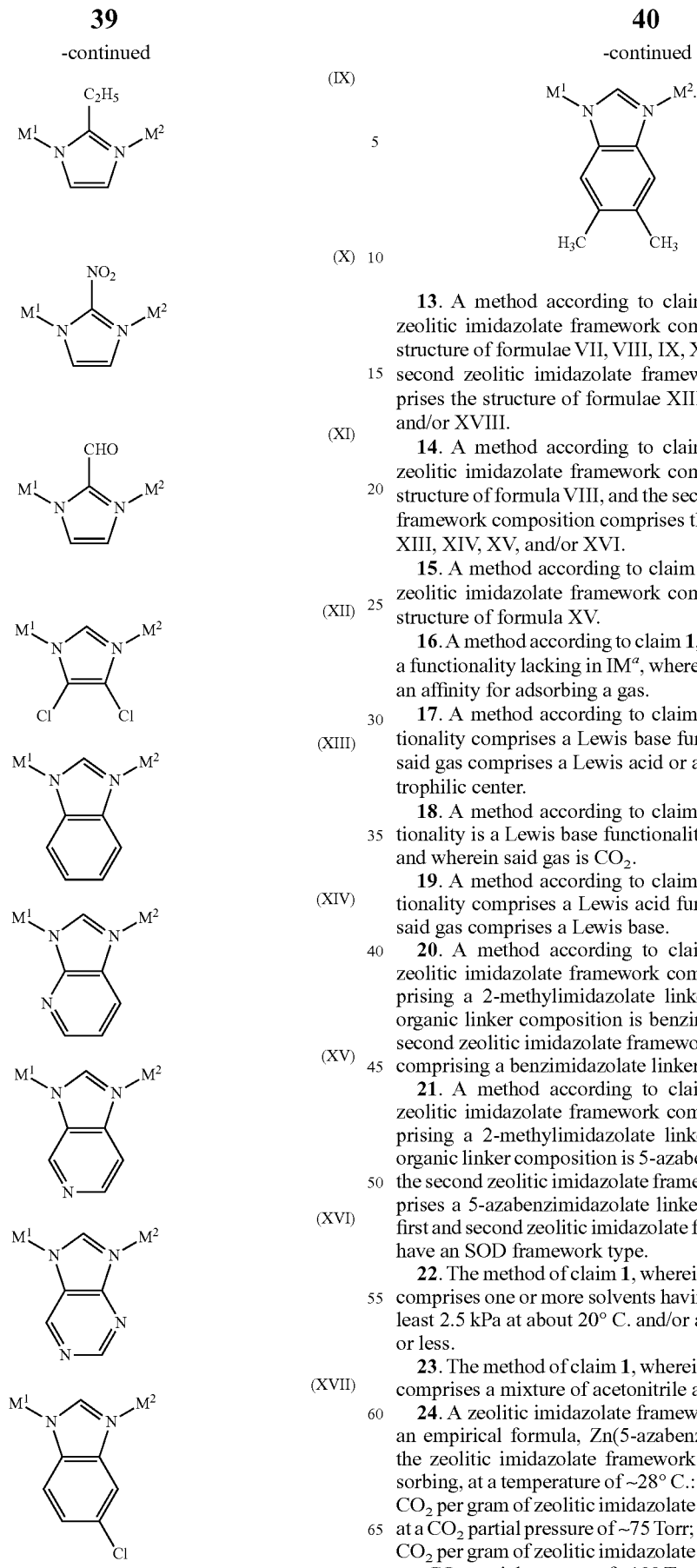

13. A method according to claim 12, wherein the first zeolitic imidazolate framework composition comprises the structure of formulae VII, VIII, IX, X, XI, and/or XI, and the second zeolitic imidazolate framework composition comprises the structure of formulae XIII, XIV, XV, XVI, XVII, and/or XVIII.

14. A method according to claim 13, wherein the first zeolitic imidazolate framework composition comprises the structure of formula VIII, and the second zeolitic imidazolate framework composition comprises the structure of formulae XIII, XIV, XV, and/or XVI.

15. A method according to claim 14, wherein the second zeolitic imidazolate framework composition comprises the structure of formula XV.

16. A method according to claim 1, wherein $IM^b$ comprises a functionality lacking in $IM^a$, wherein said functionality has an affinity for adsorbing a gas.

17. A method according to claim 16, wherein said functionality comprises a Lewis base functionality, and wherein said gas comprises a Lewis acid or a molecule with an electrophilic center.

18. A method according to claim 17, wherein said functionality is a Lewis base functionality in a benzamidazolate, and wherein said gas is $CO_2$.

19. A method according to claim 16, wherein said functionality comprises a Lewis acid functionality, and wherein said gas comprises a Lewis base.

20. A method according to claim 1, wherein the first zeolitic imidazolate framework composition is ZIF-8 comprising a 2-methylimidazolate linker, wherein the second organic linker composition is benzimidazolate, wherein the second zeolitic imidazolate framework composition is ZIF-7 comprising a benzimidazolate linker.

21. A method according to claim 1, wherein the first zeolitic imidazolate framework composition is ZIF-8 comprising a 2-methylimidazolate linker, wherein the second organic linker composition is 5-azabenzimidazolate, wherein the second zeolitic imidazolate framework composition comprises a 5-azabenzimidazolate linker, and wherein both the first and second zeolitic imidazolate framework compositions have an SOD framework type.

22. The method of claim 1, wherein the liquid composition comprises one or more solvents having a vapor pressure of at least 2.5 kPa at about 20° C. and/or a boiling point of 99° C. or less.

23. The method of claim 1, wherein the liquid composition comprises a mixture of acetonitrile and triethylamine.

24. A zeolitic imidazolate framework composition having an empirical formula, Zn(5-azabenzimidazolate)$_2$, wherein the zeolitic imidazolate framework structure is capable of sorbing, at a temperature of ~28° C.: (i) at least 0.30 mmol of $CO_2$ per gram of zeolitic imidazolate framework composition at a $CO_2$ partial pressure of ~75 Torr; (ii) at least 0.35 mmol of $CO_2$ per gram of zeolitic imidazolate framework composition at a $CO_2$ partial pressure of ~100 Torr; and/or (iii) at least 0.50 mmol of $CO_2$ per gram of zeolitic imidazolate framework composition at a $CO_2$ partial pressure of ~200 Torr.

25. A composition of matter according to claim 24, further comprising at least 0.30 mmol of $CO_2$ per gram of zeolitic imidazolate framework structure.

26. A composition of matter having an empirical formula Zn(5-azabenzimidazolate)$_2$ and exhibiting an SOD framework type.

27. A method of adsorbing a gas comprising contacting the gas with the porous crystalline material of claim 26.

28. The method of claim 27, wherein the gas is hydrogen, nitrogen, oxygen, a noble gas, carbon monoxide, carbon dioxide, sulfur dioxide, sulfur trioxide, hydrogen sulfide, ammonia, a hydrocarbon or an amine.

29. A method of separating a gas from a fluid stream containing the gas comprising contacting the fluid stream with the porous crystalline material of claim 26.

30. The method of claim 29, wherein the gas is hydrogen, nitrogen, oxygen, a noble gas, carbon monoxide, carbon dioxide, sulfur dioxide, sulfur trioxide, hydrogen sulfide, ammonia, a hydrocarbon or an amine.

* * * * *